United States Patent
Barak et al.

(10) Patent No.: US 11,269,498 B2
(45) Date of Patent: Mar. 8, 2022

(54) DYNAMIC USER INTERFACE CUSTOMIZATION

(71) Applicant: LivePerson, Inc., New York, NY (US)

(72) Inventors: Matan Barak, Ra'anana (IL); Amir Shub, Tenafly, NJ (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/004,362

(22) Filed: Aug. 27, 2020

(65) Prior Publication Data

US 2021/0117057 A1 Apr. 22, 2021

Related U.S. Application Data

(63) Continuation of application No. 15/389,598, filed on Dec. 23, 2016, now Pat. No. 10,795,548, which is a
(Continued)

(51) Int. Cl.
*G06F 9/445* (2018.01)
*G06F 3/0484* (2022.01)
(Continued)

(52) U.S. Cl.
CPC ........ *G06F 3/0484* (2013.01); *G06F 9/44526* (2013.01); *G06F 9/451* (2018.02); *G06F 8/60* (2013.01)

(58) Field of Classification Search
CPC ....................................................... G06F 8/60
See application file for complete search history.

(56) References Cited

U.S. PATENT DOCUMENTS

| 5,450,537 A | 9/1995 | Hirai et al. |
| 5,517,405 A | 5/1996 | McAndrew et al. |

(Continued)

FOREIGN PATENT DOCUMENTS

| CN | 102143235 | 8/2011 |
| CN | 104394191 | 3/2015 |

(Continued)

OTHER PUBLICATIONS

Chartrand Sabra, "A new system seeks to ease the bottleneck in the customer-service information highway," The New York Times (Apr. 30, 2001), 2 pages.
(Continued)

*Primary Examiner* — Di Xiao
(74) *Attorney, Agent, or Firm* — Polsinelli LLP

(57) ABSTRACT

Described are computer-based methods and apparatuses, including computer program products, for dynamic user interface customization. A set of functions for a user interface is stored, each function comprising a function that can be added to the user interface. A first set of data is transmitted to a remote device that causes the user interface to be displayed on the remote device with a predetermined set of functions from the set of functions. Interaction data is received indicative of a user's interactions with the user interface. A second set of data is transmitted to the remote device that causes the user interface to dynamically add a new function from the set of functions to the user interface based on the interaction data, wherein the new function is displayed as a selectable item in the user interface that the user can select to use a function associated with the new function.

20 Claims, 4 Drawing Sheets

Related U.S. Application Data continuation of application No. 13/841,434, filed on Mar. 15, 2013, now Pat. No. 9,563,336.

(60) Provisional application No. 61/638,825, filed on Apr. 26, 2012.

(51) Int. Cl.
  *G06F 9/451* (2018.01)
  *G06F 8/60* (2018.01)

(56) References Cited

U.S. PATENT DOCUMENTS

| | | |
|---|---|---|
| 5,563,805 A | 10/1996 | Arbuckle et al. |
| 5,572,643 A | 11/1996 | Judson |
| 5,581,702 A | 12/1996 | McArdle et al. |
| 5,583,763 A | 12/1996 | Atcheson et al. |
| 5,590,038 A | 12/1996 | Pitroda |
| 5,592,378 A | 1/1997 | Cameron et al. |
| 5,596,493 A | 1/1997 | Tone |
| 5,611,052 A | 3/1997 | Dykstra et al. |
| 5,636,346 A | 6/1997 | Saxe |
| 5,664,115 A | 9/1997 | Fraser |
| 5,668,953 A | 9/1997 | Sloo |
| 5,678,002 A | 10/1997 | Fawcett et al. |
| 5,694,163 A | 12/1997 | Harrison |
| 5,696,907 A | 12/1997 | Tom |
| 5,699,526 A | 12/1997 | Siefert |
| 5,704,029 A | 12/1997 | Wright |
| 5,710,887 A | 1/1998 | Chelliah et al. |
| 5,715,402 A | 2/1998 | Popolo |
| 5,724,155 A | 3/1998 | Saito |
| 5,724,522 A | 3/1998 | Kagami et al. |
| 5,727,048 A | 3/1998 | Hiroshima et al. |
| 5,727,163 A | 3/1998 | Bezos |
| 5,732,400 A | 3/1998 | Mandler et al. |
| 5,745,654 A | 4/1998 | Titan |
| 5,748,755 A | 5/1998 | Johnson et al. |
| 5,758,328 A | 5/1998 | Giovannoli |
| 5,760,771 A | 6/1998 | Blonder et al. |
| 5,761,640 A | 6/1998 | Kalyanswamy et al. |
| 5,761,649 A | 6/1998 | Hill |
| 5,764,916 A | 6/1998 | Busey et al. |
| 5,765,142 A | 6/1998 | Allred et al. |
| 5,774,869 A | 6/1998 | Toader |
| 5,774,870 A | 6/1998 | Storey |
| 5,774,882 A | 6/1998 | Keen et al. |
| 5,774,883 A | 6/1998 | Andersen et al. |
| 5,778,164 A | 7/1998 | Watkins et al. |
| 5,784,568 A | 7/1998 | Needham |
| 5,793,365 A | 8/1998 | Tang et al. |
| 5,794,207 A | 8/1998 | Walker et al. |
| 5,796,393 A | 8/1998 | MacNaughton et al. |
| 5,796,952 A | 8/1998 | Davis |
| 5,797,133 A | 8/1998 | Jones et al. |
| 5,799,151 A | 8/1998 | Hoffer |
| 5,805,159 A | 9/1998 | Bertram et al. |
| 5,806,043 A | 9/1998 | Toader |
| 5,812,769 A | 9/1998 | Graber et al. |
| 5,815,663 A | 9/1998 | Uomini |
| 5,818,907 A | 10/1998 | Mahoney et al. |
| 5,819,029 A | 10/1998 | Edwards et al. |
| 5,819,235 A | 10/1998 | Tamai et al. |
| 5,819,236 A | 10/1998 | Josephson |
| 5,819,291 A | 10/1998 | Haimowitz et al. |
| 5,825,869 A | 10/1998 | Brooks et al. |
| 5,826,241 A | 10/1998 | Stein et al. |
| 5,826,244 A | 10/1998 | Huberman |
| 5,828,839 A | 10/1998 | Moncreiff |
| 5,832,465 A | 11/1998 | Tom |
| 5,835,087 A | 11/1998 | Herz et al. |
| 5,838,682 A | 11/1998 | Dekelbaum et al. |
| 5,838,910 A | 11/1998 | Domenikos et al. |
| 5,839,117 A | 11/1998 | Cameron et al. |
| 5,850,517 A | 12/1998 | Verkler et al. |
| 5,852,809 A | 12/1998 | Abel et al. |
| 5,857,079 A | 1/1999 | Claus et al. |
| 5,859,974 A | 1/1999 | McArdle et al. |
| 5,862,330 A | 1/1999 | Anupam et al. |
| 5,866,889 A | 2/1999 | Weiss et al. |
| 5,870,721 A | 2/1999 | Norris |
| 5,878,403 A | 3/1999 | DeFrancesco et al. |
| 5,895,454 A | 4/1999 | Harrington |
| 5,903,641 A | 5/1999 | Tonisson |
| 5,907,677 A | 5/1999 | Glenn et al. |
| 5,911,135 A | 6/1999 | Atkins |
| 5,916,302 A | 6/1999 | Dunn et al. |
| 5,918,014 A | 6/1999 | Robinson |
| 5,924,082 A | 7/1999 | Silverman et al. |
| 5,930,776 A | 7/1999 | Dykstra et al. |
| 5,940,811 A | 8/1999 | Norris |
| 5,940,812 A | 8/1999 | Tengel et al. |
| 5,943,416 A | 8/1999 | Gisby et al. |
| 5,943,478 A | 8/1999 | Aggarwal et al. |
| 5,945,989 A | 8/1999 | Freishtat et al. |
| 5,948,061 A | 9/1999 | Merriman et al. |
| 5,950,179 A | 9/1999 | Buchanan et al. |
| 5,956,693 A | 9/1999 | Geerlings |
| 5,958,014 A | 9/1999 | Cave |
| 5,960,411 A | 9/1999 | Hartman et al. |
| 5,963,625 A | 10/1999 | Kawecki et al. |
| 5,963,635 A | 10/1999 | Szlam |
| 5,966,699 A | 10/1999 | Zandi |
| 5,970,475 A | 10/1999 | Barnes et al. |
| 5,970,478 A | 10/1999 | Walker et al. |
| 5,974,396 A | 10/1999 | Anderson |
| 5,974,446 A | 10/1999 | Sonnenrich et al. |
| 5,987,434 A | 11/1999 | Libman |
| 5,991,740 A | 11/1999 | Messer |
| 5,995,947 A | 11/1999 | Fraser et al. |
| 6,000,832 A | 12/1999 | Franklin et al. |
| 6,003,013 A | 12/1999 | Boushy |
| 6,009,410 A | 12/1999 | LeMole et al. |
| 6,014,644 A | 1/2000 | Erickson |
| 6,014,645 A | 1/2000 | Cunningham |
| 6,014,647 A | 1/2000 | Nizzari |
| 6,016,504 A | 1/2000 | Arnold et al. |
| 6,026,370 A | 2/2000 | Jermyn |
| 6,028,601 A | 2/2000 | Machiraju et al. |
| 6,029,141 A | 2/2000 | Bezos et al. |
| 6,029,149 A | 2/2000 | Dykstra et al. |
| 6,029,890 A | 2/2000 | Austin et al. |
| 6,044,146 A | 3/2000 | Gisby et al. |
| 6,044,360 A | 3/2000 | Picciallo |
| 6,049,784 A | 4/2000 | Weatherly et al. |
| 6,052,447 A | 4/2000 | Golden |
| 6,052,730 A | 4/2000 | Felciano |
| 6,055,573 A | 4/2000 | Gardenswartz et al. |
| 6,058,375 A | 5/2000 | Park et al. |
| 6,058,428 A | 5/2000 | Wang et al. |
| 6,061,658 A | 5/2000 | Chou et al. |
| 6,064,987 A | 5/2000 | Walker et al. |
| 6,067,525 A | 5/2000 | Jonhson et al. |
| 6,070,149 A | 5/2000 | Tavor et al. |
| 6,073,112 A | 6/2000 | Geerlings |
| 6,076,100 A | 6/2000 | Cottrille et al. |
| 6,078,892 A | 6/2000 | Anderson et al. |
| 6,084,585 A | 7/2000 | Kraft et al. |
| 6,085,126 A | 7/2000 | Mellgren, III et al. |
| 6,085,195 A | 7/2000 | Hoyt et al. |
| 6,088,686 A | 7/2000 | Walker et al. |
| 6,105,007 A | 8/2000 | Norris |
| 6,112,190 A | 8/2000 | Fletcher et al. |
| 6,119,101 A | 9/2000 | Peckover |
| 6,119,103 A | 9/2000 | Basch et al. |
| 6,131,087 A | 10/2000 | Luke et al. |
| 6,131,095 A | 10/2000 | Low et al. |
| 6,134,318 A | 10/2000 | O'Neil |
| 6,134,530 A | 10/2000 | Bunting et al. |
| 6,134,532 A | 10/2000 | Lazarus et al. |
| 6,134,533 A | 10/2000 | Shell |
| 6,134,548 A | 10/2000 | Gottsman et al. |
| 6,138,139 A | 10/2000 | Beck et al. |
| 6,141,653 A | 10/2000 | Conklin et al. |

(56) References Cited

U.S. PATENT DOCUMENTS

| | | |
|---|---|---|
| 6,144,991 A | 11/2000 | England |
| 6,163,607 A | 12/2000 | Bogart et al. |
| 6,167,395 A | 12/2000 | Beck et al. |
| 6,170,011 B1 | 1/2001 | Macleod Beck et al. |
| 6,173,053 B1 | 1/2001 | Bogart et al. |
| 6,182,050 B1 | 1/2001 | Ballard |
| 6,182,124 B1 | 1/2001 | Lau et al. |
| 6,185,543 B1 | 2/2001 | Galperin et al. |
| 6,189,003 B1 | 2/2001 | Leal |
| 6,192,319 B1 | 2/2001 | Simonson |
| 6,192,380 B1 | 2/2001 | Light et al. |
| 6,195,426 B1 | 2/2001 | Bolduc et al. |
| 6,199,079 B1 | 3/2001 | Gupta et al. |
| 6,202,053 B1 | 3/2001 | Christiansen et al. |
| 6,202,155 B1 | 3/2001 | Tushie et al. |
| 6,208,979 B1 | 3/2001 | Sinclair |
| 6,222,919 B1 | 4/2001 | Hollatz et al. |
| 6,230,121 B1 | 5/2001 | Weber |
| 6,236,975 B1 | 5/2001 | Boe et al. |
| 6,240,396 B1 | 5/2001 | Walker et al. |
| 6,249,795 B1 | 6/2001 | Douglis |
| 6,262,730 B1 | 7/2001 | Horvitz |
| 6,267,292 B1 | 7/2001 | Walker et al. |
| 6,272,506 B1 | 8/2001 | Bell |
| 6,282,284 B1 | 8/2001 | Dezonno et al. |
| 6,285,983 B1 | 9/2001 | Jenkins |
| 6,289,319 B1 | 9/2001 | Lockwood |
| 6,292,786 B1 | 9/2001 | Deaton |
| 6,295,061 B1 | 9/2001 | Park et al. |
| 6,298,348 B1 | 10/2001 | Eldering |
| 6,311,169 B2 | 10/2001 | Duhon |
| 6,311,178 B1 | 10/2001 | Bi et al. |
| 6,324,524 B1 | 11/2001 | Lent et al. |
| 6,327,574 B1 | 12/2001 | Kramer et al. |
| 6,330,546 B1 | 12/2001 | Gopinathan et al. |
| 6,334,110 B1 | 12/2001 | Walter |
| 6,338,066 B1 | 1/2002 | Martin |
| 6,346,952 B1 | 2/2002 | Shtivelman |
| 6,349,290 B1 | 2/2002 | Horowitz et al. |
| 6,356,909 B1 | 3/2002 | Spencer |
| 6,374,230 B1 | 4/2002 | Walker et al. |
| 6,377,936 B1 | 4/2002 | Henrick et al. |
| 6,381,640 B1 | 4/2002 | Beck |
| 6,385,594 B1 | 5/2002 | Lebda et al. |
| 6,393,479 B1 | 5/2002 | Glommen et al. |
| 6,405,181 B2 | 6/2002 | Lent et al. |
| 6,438,526 B1 | 8/2002 | Dykes et al. |
| 6,449,358 B1 | 9/2002 | Anisimov |
| 6,449,646 B1 | 9/2002 | Sikora et al. |
| 6,463,149 B1 | 10/2002 | Jolissaint et al. |
| 6,466,970 B1 | 10/2002 | Lee |
| 6,477,533 B2 | 11/2002 | Schiff et al. |
| 6,507,851 B1 | 1/2003 | Fujiwara et al. |
| 6,510,418 B1 | 1/2003 | Case et al. |
| 6,510,427 B1 | 1/2003 | Bossemeyer, Jr. et al. |
| 6,516,421 B1 | 2/2003 | Peters |
| 6,519,628 B1 | 2/2003 | Locascio |
| 6,526,404 B1 | 2/2003 | Slater |
| 6,535,492 B2 | 3/2003 | Shtivelman |
| 6,542,936 B1 | 4/2003 | Mayle et al. |
| 6,546,372 B2 | 4/2003 | Lauffer |
| 6,549,919 B2 | 4/2003 | Lambert et al. |
| 6,567,791 B2 | 5/2003 | Lent et al. |
| 6,571,236 B1 | 5/2003 | Ruppelt |
| 6,597,377 B1 | 7/2003 | MacPhai |
| 6,606,744 B1 | 8/2003 | Mikurak |
| 6,618,746 B2 | 9/2003 | Desai et al. |
| 6,622,131 B1 | 9/2003 | Brown et al. |
| 6,622,138 B1 | 9/2003 | Bellamkonda |
| 6,654,815 B1 | 11/2003 | Goss |
| 6,662,215 B1 | 12/2003 | Moskowitz et al. |
| 6,665,395 B1 | 12/2003 | Busey et al. |
| 6,671,818 B1 | 12/2003 | Mikurak |
| 6,691,151 B1 | 2/2004 | Cheyer et al. |
| 6,691,159 B1 | 2/2004 | Grewal et al. |
| 6,701,441 B1 | 3/2004 | Balasubramaniam et al. |
| 6,718,313 B1 | 4/2004 | Lent et al. |
| 6,721,713 B1 | 4/2004 | Guheen et al. |
| 6,725,210 B1 | 4/2004 | Key |
| 6,741,995 B1 | 5/2004 | Chen |
| 6,760,429 B1 | 7/2004 | Hung et al. |
| 6,766,302 B2 | 7/2004 | Bach |
| 6,771,766 B1 | 8/2004 | Shafiee et al. |
| 6,778,982 B1 | 8/2004 | Knight |
| 6,795,812 B1 | 9/2004 | Lent et al. |
| 6,804,659 B1 | 10/2004 | Graham et al. |
| 6,826,594 B1 | 11/2004 | Pettersen |
| 6,829,585 B1 | 12/2004 | Grewal et al. |
| 6,836,768 B1 | 12/2004 | Hirsh |
| 6,839,680 B1 | 1/2005 | Liu |
| 6,839,682 B1 | 1/2005 | Blume |
| 6,850,896 B1 | 2/2005 | Kelman et al. |
| 6,865,267 B2 | 3/2005 | Dezono |
| 6,892,226 B1 | 5/2005 | Tso et al. |
| 6,892,347 B1 | 5/2005 | Williams |
| 6,904,408 B1 | 6/2005 | McCarthy et al. |
| 6,920,434 B1 | 7/2005 | Cossette |
| 6,922,705 B1 | 7/2005 | Northrup |
| 6,925,441 B1 | 8/2005 | Jones |
| 6,925,442 B1 | 8/2005 | Shapira et al. |
| 6,950,983 B1 | 9/2005 | Snavely |
| 6,965,868 B1 | 11/2005 | Bednarek |
| 6,981,028 B1 | 12/2005 | Rawat et al. |
| 6,993,557 B1 | 1/2006 | Yen |
| 7,003,476 B1 | 2/2006 | Samra et al. |
| 7,013,329 B1 | 3/2006 | Paul et al. |
| 7,039,599 B2 | 5/2006 | Merriman et al. |
| 7,051,273 B1 | 5/2006 | Holt et al. |
| 7,076,443 B1 | 7/2006 | Emens et al. |
| 7,085,682 B1 | 8/2006 | Heller et al. |
| 7,092,959 B2 | 8/2006 | Chen |
| 7,106,850 B2 | 9/2006 | Campbell et al. |
| 7,123,974 B1 | 10/2006 | Hamilton |
| 7,143,063 B2 | 11/2006 | Lent et al. |
| 7,181,492 B2 | 2/2007 | Wen et al. |
| 7,200,614 B2 | 4/2007 | Reid et al. |
| 7,242,760 B2 | 7/2007 | Shires |
| 7,243,109 B2 | 7/2007 | Omega et al. |
| 7,251,648 B2 | 7/2007 | Chaudhuri et al. |
| 7,266,510 B1 | 9/2007 | Cofino |
| 7,287,000 B2 | 10/2007 | Boyd et al. |
| 7,313,575 B2 | 12/2007 | Carr et al. |
| 7,337,127 B1 | 2/2008 | Smith et al. |
| 7,346,576 B2 | 3/2008 | Lent et al. |
| 7,346,604 B1 | 3/2008 | Bharat et al. |
| 7,346,606 B2 | 3/2008 | Bharat |
| 7,370,002 B2 | 5/2008 | Heckerman et al. |
| 7,376,603 B1 | 5/2008 | Mayr et al. |
| 7,403,973 B2 | 7/2008 | Wilsher et al. |
| 7,424,363 B2 | 9/2008 | Cheng |
| 7,467,349 B1 | 12/2008 | Bryar et al. |
| 7,523,191 B1 | 4/2009 | Thomas et al. |
| 7,526,439 B2 | 4/2009 | Freishtat et al. |
| 7,536,320 B2 | 5/2009 | McQueen et al. |
| 7,552,080 B1 | 6/2009 | Willard et al. |
| 7,552,365 B1 | 6/2009 | Marsh |
| 7,562,058 B2 | 7/2009 | Pinto |
| 7,590,550 B2 | 9/2009 | Schoenberg |
| 7,630,986 B1 | 12/2009 | Herz et al. |
| 7,650,381 B2 | 1/2010 | Peters |
| 7,657,465 B2 | 2/2010 | Freishtat et al. |
| 7,660,815 B1 | 2/2010 | Scofield |
| 7,689,924 B1 | 3/2010 | Schneider et al. |
| 7,702,635 B2 | 4/2010 | Horvitz et al. |
| 7,716,322 B2 | 5/2010 | Benedikt et al. |
| 7,730,010 B2 | 6/2010 | Kishore et al. |
| 7,734,503 B2 | 6/2010 | Agarwal et al. |
| 7,734,632 B2 | 6/2010 | Wang |
| 7,739,149 B2 | 6/2010 | Freishtat et al. |
| 7,743,044 B1 | 6/2010 | Kalogeraki |
| 7,818,340 B1 | 10/2010 | Warren |
| 7,827,128 B1 | 11/2010 | Karlsson et al. |
| 7,865,457 B2 | 1/2011 | Ravin et al. |
| 7,877,679 B2 | 1/2011 | Ozana |

(56) References Cited

U.S. PATENT DOCUMENTS

| | | |
|---|---|---|
| 7,895,193 B2 | 2/2011 | Cucerzan |
| 7,958,066 B2 | 6/2011 | Pinckney et al. |
| 7,966,564 B2 | 6/2011 | Catlin et al. |
| 7,975,020 B1 | 7/2011 | Green et al. |
| 8,010,422 B1 | 8/2011 | Lascelles et al. |
| 8,065,666 B2 | 11/2011 | Schnabele |
| 8,166,026 B1 | 4/2012 | Sadler |
| 8,185,544 B2 | 5/2012 | Oztekin et al. |
| 8,260,846 B2 | 9/2012 | Lahav |
| 8,266,127 B2 | 9/2012 | Mattox et al. |
| 8,321,906 B2 | 11/2012 | Agrusa |
| 8,386,340 B1 | 2/2013 | Feinstein |
| 8,386,509 B1 | 2/2013 | Scofield |
| 8,392,580 B2 | 3/2013 | Allen et al. |
| 8,478,816 B2 | 7/2013 | Parks et al. |
| 8,738,732 B2 | 5/2014 | Karidi |
| 8,762,313 B2 | 6/2014 | Lahav et al. |
| 8,799,200 B2 | 8/2014 | Lahav |
| 8,805,844 B2 | 8/2014 | Schorzman et al. |
| 8,805,941 B2 | 8/2014 | Barak et al. |
| 8,812,601 B2 | 8/2014 | Hsueh et al. |
| 8,843,481 B1 | 9/2014 | Xu |
| 8,868,448 B2 | 10/2014 | Freishtat et al. |
| 8,918,465 B2 | 12/2014 | Barak |
| 8,943,002 B2 | 1/2015 | Zelenko et al. |
| 8,943,145 B1 | 1/2015 | Peters et al. |
| 8,954,539 B2 | 2/2015 | Lahav |
| 8,965,998 B1 | 2/2015 | Dicker |
| 9,104,970 B2 | 8/2015 | Lahav et al. |
| 9,247,066 B1 | 1/2016 | Stec et al. |
| 9,256,761 B1 | 2/2016 | Sahu |
| 9,331,969 B2 | 5/2016 | Barak et al. |
| 9,336,487 B2 | 5/2016 | Lahav |
| 9,350,598 B2 | 5/2016 | Barak et al. |
| 9,396,295 B2 | 7/2016 | Lahav et al. |
| 9,396,436 B2 | 7/2016 | Lahav |
| 9,432,468 B2 | 8/2016 | Karidi |
| 9,525,745 B2 | 12/2016 | Karidi |
| 9,558,276 B2 | 1/2017 | Barak et al. |
| 9,563,336 B2 | 2/2017 | Barak et al. |
| 9,563,707 B2 | 2/2017 | Barak et al. |
| 9,569,537 B2 | 2/2017 | Barak et al. |
| 9,576,292 B2 | 2/2017 | Freishtat et al. |
| 9,582,579 B2 | 2/2017 | Barak et al. |
| 9,590,930 B2 | 3/2017 | Karidi |
| 9,672,196 B2 | 6/2017 | Shachar et al. |
| 9,767,212 B2 | 9/2017 | Lavi et al. |
| 9,819,561 B2 | 11/2017 | Freishtat et al. |
| 9,892,417 B2 | 2/2018 | Shachar et al. |
| 9,948,582 B2 | 4/2018 | Karidi |
| 10,038,683 B2 | 7/2018 | Barak et al. |
| 10,142,908 B2 | 11/2018 | Barak et al. |
| 10,191,622 B2 | 1/2019 | Karidi et al. |
| 10,278,065 B2 | 4/2019 | Stuber et al. |
| 2001/0001150 A1 | 5/2001 | Miloslavsky |
| 2001/0011245 A1 | 8/2001 | Duhon |
| 2001/0011246 A1 | 8/2001 | Tammaro |
| 2001/0011262 A1 | 8/2001 | Hoyt et al. |
| 2001/0011282 A1 | 8/2001 | Katsumata et al. |
| 2001/0013009 A1 | 8/2001 | Greening et al. |
| 2001/0014877 A1 | 8/2001 | Defrancesco et al. |
| 2001/0025249 A1 | 9/2001 | Tokunaga |
| 2001/0027436 A1 | 10/2001 | Tenembaum |
| 2001/0032140 A1 | 10/2001 | Hoffman |
| 2001/0032244 A1 | 10/2001 | Neustel |
| 2001/0034689 A1 | 10/2001 | Heilman |
| 2001/0044751 A1 | 11/2001 | Pugliese |
| 2001/0054041 A1 | 12/2001 | Chang |
| 2001/0054064 A1 | 12/2001 | Kannan |
| 2001/0056405 A1 | 12/2001 | Muyres |
| 2002/0002491 A1 | 1/2002 | Whitfield |
| 2002/0004735 A1 | 1/2002 | Gross |
| 2002/0010625 A1 | 1/2002 | Smith et al. |
| 2002/0016731 A1 | 2/2002 | Kupersmit |
| 2002/0023051 A1 | 2/2002 | Kunzle et al. |
| 2002/0026351 A1 | 2/2002 | Coleman |
| 2002/0029188 A1 | 3/2002 | Schmid |
| 2002/0029267 A1 | 3/2002 | Sankuratripati et al. |
| 2002/0035486 A1 | 3/2002 | Huyn et al. |
| 2002/0038230 A1 | 3/2002 | Chen |
| 2002/0038388 A1 | 3/2002 | Netter |
| 2002/0045154 A1 | 4/2002 | Wood |
| 2002/0046086 A1 | 4/2002 | Pletz |
| 2002/0046096 A1 | 4/2002 | Srinivasan |
| 2002/0047859 A1 | 4/2002 | Szlam et al. |
| 2002/0055878 A1 | 5/2002 | Burton et al. |
| 2002/0059095 A1 | 5/2002 | Cook |
| 2002/0067500 A1 | 6/2002 | Yokomizo et al. |
| 2002/0073162 A1 | 6/2002 | McErlean |
| 2002/0082923 A1 | 6/2002 | Merriman et al. |
| 2002/0083095 A1 | 6/2002 | Wu et al. |
| 2002/0083167 A1 | 6/2002 | Costigan et al. |
| 2002/0085705 A1 | 7/2002 | Shires |
| 2002/0091832 A1 | 7/2002 | Low et al. |
| 2002/0099694 A1 | 7/2002 | Diamond et al. |
| 2002/0107728 A1 | 8/2002 | Bailey et al. |
| 2002/0111847 A1 | 8/2002 | Smith |
| 2002/0111850 A1 | 8/2002 | Smrcka et al. |
| 2002/0123926 A1 | 9/2002 | Bushold |
| 2002/0161620 A1 | 10/2002 | Hatanaka |
| 2002/0161651 A1 | 10/2002 | Godsey |
| 2002/0161664 A1 | 10/2002 | Shaya et al. |
| 2002/0167539 A1 | 11/2002 | Brown et al. |
| 2003/0004781 A1 | 1/2003 | Mallon |
| 2003/0009768 A1 | 1/2003 | Moir |
| 2003/0011641 A1 | 1/2003 | Totman et al. |
| 2003/0014304 A1 | 1/2003 | Calvert et al. |
| 2003/0023754 A1 | 1/2003 | Eichstadt et al. |
| 2003/0028415 A1 | 2/2003 | Herschap et al. |
| 2003/0036949 A1 | 2/2003 | Kaddeche et al. |
| 2003/0041056 A1 | 2/2003 | Bossemeyer et al. |
| 2003/0055778 A1 | 3/2003 | Erlanger |
| 2003/0061091 A1 | 3/2003 | Amaratunga |
| 2003/0079176 A1 | 4/2003 | Kang et al. |
| 2003/0105826 A1 | 6/2003 | Mayraz |
| 2003/0110130 A1 | 6/2003 | Pelletier |
| 2003/0140037 A1 | 7/2003 | Deh-Lee |
| 2003/0149581 A1 | 8/2003 | Chaudhri et al. |
| 2003/0149937 A1 | 8/2003 | McElfresh et al. |
| 2003/0154196 A1 | 8/2003 | Goodwin et al. |
| 2003/0167195 A1 | 9/2003 | Fernandes et al. |
| 2003/0177096 A1 | 9/2003 | Trent et al. |
| 2003/0195848 A1 | 10/2003 | Felger |
| 2003/0217332 A1 | 11/2003 | Smith et al. |
| 2003/0221163 A1 | 11/2003 | Glover et al. |
| 2003/0233425 A1 | 12/2003 | Lyons et al. |
| 2004/0034567 A1 | 2/2004 | Gravett |
| 2004/0064412 A1 | 4/2004 | Phillips et al. |
| 2004/0073475 A1 | 4/2004 | Tupper |
| 2004/0088323 A1 | 5/2004 | Elder et al. |
| 2004/0128390 A1 | 7/2004 | Blakley et al. |
| 2004/0128624 A1 | 7/2004 | Arellano |
| 2004/0141016 A1 | 7/2004 | Fukatsu et al. |
| 2004/0153368 A1 | 8/2004 | Freishtat et al. |
| 2004/0163101 A1 | 8/2004 | Swix et al. |
| 2004/0167928 A1 | 8/2004 | Anderson et al. |
| 2004/0193377 A1 | 9/2004 | Brown |
| 2004/0210820 A1 | 10/2004 | Tarr et al. |
| 2004/0243539 A1 | 12/2004 | Skurtovich et al. |
| 2004/0249650 A1 | 12/2004 | Freedman |
| 2004/0260574 A1 | 12/2004 | Gross |
| 2005/0004864 A1 | 1/2005 | Lent et al. |
| 2005/0014117 A1 | 1/2005 | Stillman |
| 2005/0033641 A1 | 2/2005 | Jha et al. |
| 2005/0033728 A1 | 2/2005 | Sarita James |
| 2005/0044149 A1 | 2/2005 | Regardie et al. |
| 2005/0091254 A1 | 4/2005 | Stabb |
| 2005/0096963 A1 | 5/2005 | Myr |
| 2005/0096997 A1 | 5/2005 | Jain et al. |
| 2005/0097089 A1 | 5/2005 | Nielsen et al. |
| 2005/0102177 A1 | 5/2005 | Takayama |
| 2005/0102257 A1 | 5/2005 | Onyon et al. |
| 2005/0114195 A1 | 5/2005 | Bernasconi |
| 2005/0131944 A1 | 6/2005 | Edward |

(56) References Cited

U.S. PATENT DOCUMENTS

| | | |
|---|---|---|
| 2005/0132205 A1 | 6/2005 | Palliyil et al. |
| 2005/0138115 A1 | 6/2005 | Llamas et al. |
| 2005/0171861 A1 | 8/2005 | Bezos et al. |
| 2005/0183003 A1 | 8/2005 | Peri |
| 2005/0198120 A1 | 9/2005 | Reshef et al. |
| 2005/0198212 A1 | 9/2005 | Zilberfayn et al. |
| 2005/0198220 A1 | 9/2005 | Wada et al. |
| 2005/0216342 A1 | 9/2005 | Ashbaugh |
| 2005/0234761 A1 | 10/2005 | Pinto |
| 2005/0256955 A1 | 11/2005 | Bodwell et al. |
| 2005/0262065 A1 | 11/2005 | Barth et al. |
| 2005/0273388 A1 | 12/2005 | Roetter |
| 2005/0288943 A1 | 12/2005 | Wei et al. |
| 2006/0015390 A1 | 1/2006 | Rijisinghani et al. |
| 2006/0021009 A1 | 1/2006 | Lunt |
| 2006/0026147 A1 | 2/2006 | Cone et al. |
| 2006/0026237 A1 | 2/2006 | Wang et al. |
| 2006/0041378 A1 | 2/2006 | Chen |
| 2006/0041476 A1 | 2/2006 | Zheng |
| 2006/0041562 A1 | 2/2006 | Paczkowski et al. |
| 2006/0047615 A1 | 3/2006 | Ravin et al. |
| 2006/0059124 A1 | 3/2006 | Krishna |
| 2006/0106788 A1 | 5/2006 | Forrest |
| 2006/0122850 A1 | 6/2006 | Ward et al. |
| 2006/0168509 A1 | 7/2006 | Boss et al. |
| 2006/0224750 A1 | 10/2006 | Davies |
| 2006/0253319 A1 | 11/2006 | Chayes et al. |
| 2006/0265495 A1 | 11/2006 | Butler et al. |
| 2006/0271545 A1 | 11/2006 | Youn et al. |
| 2006/0277477 A1 | 12/2006 | Christenson |
| 2006/0282327 A1 | 12/2006 | Neal et al. |
| 2006/0282328 A1 | 12/2006 | Gerace et al. |
| 2006/0284378 A1 | 12/2006 | Snow et al. |
| 2006/0284892 A1 | 12/2006 | Sheridan |
| 2006/0288087 A1 | 12/2006 | Sun |
| 2006/0293950 A1 | 12/2006 | Meek et al. |
| 2006/0294084 A1 | 12/2006 | Patel |
| 2007/0027771 A1 | 2/2007 | Collins et al. |
| 2007/0027785 A1 | 2/2007 | Lent et al. |
| 2007/0053513 A1 | 3/2007 | Hoffberg |
| 2007/0061412 A1 | 3/2007 | Karidi et al. |
| 2007/0061421 A1 | 3/2007 | Karidi |
| 2007/0073585 A1 | 3/2007 | Apple et al. |
| 2007/0094228 A1 | 4/2007 | Nevin et al. |
| 2007/0100653 A1 | 5/2007 | Ramer et al. |
| 2007/0100688 A1 | 5/2007 | Book |
| 2007/0112958 A1 | 5/2007 | Kim |
| 2007/0116238 A1 | 5/2007 | Jacobi |
| 2007/0116239 A1 | 5/2007 | Jacobi |
| 2007/0162501 A1 | 7/2007 | Agassi et al. |
| 2007/0162846 A1 | 7/2007 | Cave |
| 2007/0168874 A1 | 7/2007 | Kloeffer |
| 2007/0185751 A1 | 8/2007 | Dempers |
| 2007/0206086 A1 | 9/2007 | Baron et al. |
| 2007/0214048 A1 | 9/2007 | Chan |
| 2007/0220092 A1 | 9/2007 | Heitzeberg et al. |
| 2007/0239527 A1 | 10/2007 | Nazer et al. |
| 2007/0250585 A1 | 10/2007 | Ly et al. |
| 2007/0256003 A1 | 11/2007 | Wagoner |
| 2007/0260596 A1 | 11/2007 | Koran et al. |
| 2007/0260624 A1 | 11/2007 | Chung et al. |
| 2007/0265873 A1 | 11/2007 | Sheth et al. |
| 2008/0021816 A1 | 1/2008 | Lent et al. |
| 2008/0033794 A1 | 2/2008 | Ou et al. |
| 2008/0033941 A1 | 2/2008 | Parrish |
| 2008/0040225 A1 | 2/2008 | Roker |
| 2008/0072170 A1 | 3/2008 | Simons |
| 2008/0133650 A1* | 6/2008 | Saarimaki ............... G06F 8/65 709/203 |
| 2008/0147480 A1 | 6/2008 | Sarma et al. |
| 2008/0147486 A1 | 6/2008 | Wu et al. |
| 2008/0147741 A1 | 6/2008 | Gonen et al. |
| 2008/0183745 A1 | 7/2008 | Cancel et al. |
| 2008/0183806 A1 | 7/2008 | Cancel et al. |
| 2008/0201436 A1 | 8/2008 | Gartner |
| 2008/0215541 A1 | 9/2008 | Li et al. |
| 2008/0222656 A1 | 9/2008 | Lyman |
| 2008/0244024 A1 | 10/2008 | Aaltonen et al. |
| 2008/0262897 A1 | 10/2008 | Howarter et al. |
| 2008/0270294 A1 | 10/2008 | Lent et al. |
| 2008/0270295 A1 | 10/2008 | Lent et al. |
| 2008/0275864 A1 | 11/2008 | Kim |
| 2008/0288658 A1 | 11/2008 | Banga |
| 2008/0319778 A1 | 12/2008 | Abhyanker |
| 2009/0006174 A1 | 1/2009 | Lauffer |
| 2009/0006179 A1 | 1/2009 | Billingsley et al. |
| 2009/0006622 A1 | 1/2009 | Doerr |
| 2009/0028047 A1 | 1/2009 | Schmidt |
| 2009/0030859 A1 | 1/2009 | Buchs et al. |
| 2009/0037355 A1 | 2/2009 | Brave |
| 2009/0055267 A1 | 2/2009 | Roker |
| 2009/0063645 A1 | 3/2009 | Casey et al. |
| 2009/0076887 A1 | 3/2009 | Spivack et al. |
| 2009/0099904 A1 | 4/2009 | Affeld et al. |
| 2009/0119173 A1 | 5/2009 | Parsons et al. |
| 2009/0132368 A1 | 5/2009 | Cotter et al. |
| 2009/0138563 A1 | 5/2009 | Zhu |
| 2009/0138606 A1 | 5/2009 | Moran et al. |
| 2009/0164171 A1 | 6/2009 | Wold et al. |
| 2009/0177771 A1 | 7/2009 | Britton et al. |
| 2009/0210405 A1 | 8/2009 | Ortega et al. |
| 2009/0222572 A1 | 9/2009 | Fujihara |
| 2009/0228914 A1 | 9/2009 | Wong |
| 2009/0240586 A1 | 9/2009 | Ramer et al. |
| 2009/0287534 A1 | 11/2009 | Guo et al. |
| 2009/0287633 A1 | 11/2009 | Nevin et al. |
| 2009/0293001 A1 | 11/2009 | Lu et al. |
| 2009/0298480 A1 | 12/2009 | Khambete |
| 2009/0307003 A1 | 12/2009 | Benjamin |
| 2009/0319296 A1 | 12/2009 | Schoenberg |
| 2009/0327863 A1 | 12/2009 | Holt et al. |
| 2010/0017263 A1 | 1/2010 | Zernik |
| 2010/0023475 A1 | 1/2010 | Lahav |
| 2010/0023581 A1 | 1/2010 | Lahav |
| 2010/0049602 A1 | 2/2010 | Softky |
| 2010/0063879 A1 | 3/2010 | Araradian et al. |
| 2010/0106552 A1 | 4/2010 | Barillaud |
| 2010/0125657 A1 | 5/2010 | Dowling et al. |
| 2010/0169176 A1 | 7/2010 | Turakhia |
| 2010/0169342 A1 | 7/2010 | Kenedy |
| 2010/0205024 A1 | 8/2010 | Shachar et al. |
| 2010/0211579 A1 | 8/2010 | Fujioka |
| 2010/0255812 A1 | 10/2010 | Nanjundaiah et al. |
| 2010/0262558 A1 | 10/2010 | Willcock |
| 2010/0281008 A1 | 11/2010 | Braunwarth |
| 2010/0306043 A1 | 12/2010 | Lindsay et al. |
| 2011/0004888 A1 | 1/2011 | Srinivasan et al. |
| 2011/0041168 A1 | 2/2011 | Murray et al. |
| 2011/0055207 A1 | 3/2011 | Schorzman et al. |
| 2011/0055309 A1 | 3/2011 | Gibor et al. |
| 2011/0055331 A1 | 3/2011 | Adelman et al. |
| 2011/0055338 A1 | 3/2011 | Loeb et al. |
| 2011/0112893 A1 | 5/2011 | Karlsson et al. |
| 2011/0113101 A1 | 5/2011 | Ye et al. |
| 2011/0119264 A1 | 5/2011 | Hu et al. |
| 2011/0131077 A1 | 6/2011 | Tan |
| 2011/0137737 A1 | 6/2011 | Baird et al. |
| 2011/0138298 A1 | 6/2011 | Alfred et al. |
| 2011/0161792 A1 | 6/2011 | Florence et al. |
| 2011/0208822 A1 | 8/2011 | Rathod |
| 2011/0213655 A1 | 9/2011 | Henkin |
| 2011/0246255 A1 | 10/2011 | Gilbert et al. |
| 2011/0246406 A1 | 10/2011 | Lahav et al. |
| 2011/0258039 A1 | 10/2011 | Patwa et al. |
| 2011/0270926 A1 | 11/2011 | Boyd |
| 2011/0270934 A1 | 11/2011 | Wong et al. |
| 2011/0271175 A1 | 11/2011 | Lavi et al. |
| 2011/0271183 A1 | 11/2011 | Bose et al. |
| 2011/0307331 A1 | 12/2011 | Richard et al. |
| 2011/0320715 A1 | 12/2011 | Ickman et al. |
| 2012/0012358 A1 | 1/2012 | Horan et al. |
| 2012/0036200 A1 | 2/2012 | Cole |
| 2012/0042389 A1 | 2/2012 | Bradley et al. |
| 2012/0059722 A1 | 3/2012 | Rao |

(56) References Cited

U.S. PATENT DOCUMENTS

| | | |
|---|---|---|
| 2012/0066345 A1 | 3/2012 | Rayan |
| 2012/0130918 A1 | 5/2012 | Gordon |
| 2012/0136939 A1 | 5/2012 | Stern et al. |
| 2012/0150973 A1 | 6/2012 | Barak |
| 2012/0173373 A1 | 7/2012 | Soroca |
| 2012/0195422 A1 | 8/2012 | Famous |
| 2012/0254301 A1 | 10/2012 | Fiero |
| 2012/0259891 A1 | 10/2012 | Edoja |
| 2012/0323346 A1 | 12/2012 | Ashby et al. |
| 2012/0324008 A1 | 12/2012 | Werz |
| 2013/0013362 A1 | 1/2013 | Walker et al. |
| 2013/0013990 A1 | 1/2013 | Green |
| 2013/0036202 A1 | 2/2013 | Lahav |
| 2013/0050392 A1 | 2/2013 | Chiang |
| 2013/0054707 A1 | 2/2013 | Muszynski et al. |
| 2013/0080961 A1 | 3/2013 | Levien et al. |
| 2013/0117276 A1 | 5/2013 | Hedditch |
| 2013/0117380 A1 | 5/2013 | Pomazanov et al. |
| 2013/0117804 A1 | 5/2013 | Chawla |
| 2013/0125009 A1* | 5/2013 | DeLuca ............... H04L 67/08 715/740 |
| 2013/0132194 A1 | 5/2013 | Rajaram |
| 2013/0136253 A1 | 5/2013 | Liberman |
| 2013/0165234 A1 | 6/2013 | Hall |
| 2013/0182834 A1 | 7/2013 | Lauffer |
| 2013/0204859 A1 | 8/2013 | Vijaywargi et al. |
| 2013/0212497 A1 | 8/2013 | Zelenko et al. |
| 2013/0238714 A1 | 9/2013 | Barak et al. |
| 2013/0250354 A1 | 9/2013 | Kato |
| 2013/0268468 A1 | 10/2013 | Vijayaraghavan et al. |
| 2013/0275862 A1 | 10/2013 | Adra |
| 2013/0290533 A1 | 10/2013 | Barak |
| 2013/0311874 A1 | 11/2013 | Schachar et al. |
| 2013/0326375 A1 | 12/2013 | Barak et al. |
| 2013/0336471 A1 | 12/2013 | Agarwal et al. |
| 2013/0339445 A1 | 12/2013 | Perincherry |
| 2014/0058721 A1 | 2/2014 | Becerra |
| 2014/0068011 A1 | 3/2014 | Zhang et al. |
| 2014/0094134 A1 | 4/2014 | Balthasar |
| 2014/0115466 A1 | 4/2014 | Barak et al. |
| 2014/0189539 A1 | 7/2014 | St. Clair |
| 2014/0222888 A1 | 8/2014 | Karidi |
| 2014/0250051 A1 | 9/2014 | Lahav et al. |
| 2014/0259015 A1* | 9/2014 | Chigusa ............... G06F 9/5044 718/1 |
| 2014/0278795 A1 | 9/2014 | Satyamoorthy |
| 2014/0310229 A1 | 10/2014 | Lahav et al. |
| 2014/0331138 A1 | 11/2014 | Overton et al. |
| 2014/0358826 A1 | 12/2014 | Traupman |
| 2014/0372240 A1 | 12/2014 | Freishtat et al. |
| 2015/0006242 A1 | 1/2015 | Bhasin |
| 2015/0012602 A1 | 1/2015 | Barak et al. |
| 2015/0012848 A1 | 1/2015 | Barak et al. |
| 2015/0019525 A1 | 1/2015 | Barak et al. |
| 2015/0019527 A1 | 1/2015 | Barak et al. |
| 2015/0082345 A1 | 3/2015 | Archer |
| 2015/0101003 A1 | 4/2015 | Bull |
| 2015/0120520 A1 | 4/2015 | Jung |
| 2015/0149571 A1 | 5/2015 | Barak et al. |
| 2015/0200822 A1 | 7/2015 | Zelenko et al. |
| 2015/0213363 A1 | 7/2015 | Lahav et al. |
| 2015/0248486 A1 | 9/2015 | Barak et al. |
| 2015/0269609 A1 | 9/2015 | Mehanian |
| 2015/0278837 A1 | 10/2015 | Lahav et al. |
| 2016/0055277 A1 | 2/2016 | Lahav et al. |
| 2016/0117736 A1 | 4/2016 | Barak et al. |
| 2016/0198509 A1 | 7/2016 | Hayes, Jr. |
| 2016/0248706 A1 | 8/2016 | Karidi |
| 2016/0380932 A1 | 12/2016 | Matan et al. |
| 2017/0011146 A1 | 1/2017 | Lahav et al. |
| 2017/0026690 A1 | 1/2017 | Andrade |
| 2017/0046021 A1 | 2/2017 | Karidi |
| 2017/0054701 A1 | 2/2017 | Barak et al. |
| 2017/0169081 A1 | 6/2017 | Barak et al. |
| 2017/0171047 A1 | 6/2017 | Freishtat et al. |
| 2017/0178002 A1 | 6/2017 | Moriarty |
| 2017/0206568 A1 | 7/2017 | Schachar et al. |
| 2017/0230505 A1 | 8/2017 | McCarthy-Howe |

FOREIGN PATENT DOCUMENTS

| | | |
|---|---|---|
| EP | 840244 A1 | 5/1998 |
| EP | 1233361 A1 | 8/2002 |
| EP | 1276 064 A2 | 1/2003 |
| EP | 1549025 A1 | 6/2005 |
| EP | 1 840 803 A1 | 10/2007 |
| EP | 1845436 A2 | 10/2007 |
| EP | 1850284 A1 | 10/2007 |
| FR | 2 950 214 A1 | 3/2011 |
| JP | 9288453 A2 | 11/1997 |
| JP | 2004-054533 | 2/2004 |
| JP | 2010/128877 | 6/2010 |
| KR | 20040110399 A | 12/2004 |
| KR | 20050010487 A | 1/2005 |
| KR | 20080046310 A | 5/2008 |
| KR | 20080097751 A | 11/2008 |
| WO | 9722073 A1 | 6/1997 |
| WO | 9845797 A2 | 10/1998 |
| WO | 9909470 A1 | 2/1999 |
| WO | 9922328 A1 | 5/1999 |
| WO | 9944152 A1 | 9/1999 |
| WO | 00/57294 A1 | 9/2000 |
| WO | 0127825 A1 | 4/2001 |
| WO | 2001/035272 A2 | 5/2001 |
| WO | 02/065367 A2 | 8/2002 |
| WO | 03/032146 A1 | 4/2003 |
| WO | 2004/057473 A1 | 7/2004 |
| WO | 2005/059777 A1 | 6/2005 |
| WO | 2007/044757 A1 | 4/2007 |
| WO | 2007/129625 A1 | 11/2007 |
| WO | 2008/057181 A2 | 5/2008 |
| WO | 2008/143382 A1 | 11/2008 |
| WO | 2009/029940 A1 | 3/2009 |
| WO | 2010/099632 A1 | 9/2010 |
| WO | 2010/119379 A1 | 10/2010 |
| WO | 2010/144207 A2 | 12/2010 |
| WO | 2011/127049 A1 | 10/2011 |
| WO | 2013/119808 A1 | 8/2013 |
| WO | 2013/158830 A1 | 10/2013 |
| WO | 2013/163426 A1 | 10/2013 |
| WO | 2015/021068 A2 | 2/2015 |

OTHER PUBLICATIONS

Just Answer (2004 Faq) Archive.org cache of www.justanswer.com circa (Dec. 2004), 8 pages.

Pack Thomas, "Human Search Engines the next Killer app," (Dec. 1, 2000) Econtent DBS vol. 23; Issue 6, 7 pages.

match.com "Match.com Launches Match.com Advisors," PR Newswire (Oct. 14, 2003), 2 pages.

SITEL, "SITEL to Provide Live Agent Support Online for Expertcity. com," PR Newswire (Feb. 28, 2000), 2 pages.

Webmaster World, "Link to my website is in a frame with banner ad at the top," www.webmasterworld.com (Nov. 11, 2003), 2 pages.

Bry et al., "Realilzing Business Processes with ECA Rules: Benefits, Challenges, Limits," Principles and Practice of Sematic Web Reasoning Lecture Notes in Computer Science, pp. 48-62, LNCS, Springer, Berlin, DE (Jan. 2006).

Fairisaac, "How SmartForms for Blaze Advisor Works," www.fairisaac.com 12 pages (Jan. 2005).

Mesbah A et al., "A Component-and Push-Based Architectural Style for Ajax Applications,"The Journal of Systems & Software, 81 (12): pp. 2194-2209, Elsevier North Holland, New York, NY US (Dec. 2008).

Oracle Fusion Middleware Administrator's Guide for Oracle SOA (Oracle Guide) Suite 11g Release 1 (11.1.1) Part No. E10226-02 www.docs.oracle.com (Oct. 2009), 548 pages.

"OAuth core 1.0 Revision A [XP002570263]," OAuth Core Workgroups, pp. 1-27 www.ouath.net/core/1.0a/ (retrieved Jan. 31, 2013), 24 pages.

(56) References Cited

OTHER PUBLICATIONS

Anon., "AnswerSoft Announces Concerto; First to Combine Call Center Automation with Power of Web," Business Wire, (Feb. 3, 1997) 3 pages.
Emigh, J., "AnswerSoft Unveils Concerto for Web-Based Call Centers Feb. 5, 1996," Newsbytes, (Feb. 5, 1997) 2 pages.
Grigonis, R., "Webphony—It's not Just Callback Buttons Anymore," Computer Telephony, (Dec. 1997) 4 pages.
Wagner, M., "Caring for Customers," Internet World, (Sep. 1, 1999) 3 pages.
Sweat, J., "Human Touch—A New Wave of E-Service Offerings Blends the Web, E-Mail, and Voice Bringing People back into the Picture," Information week, (Oct. 4, 1999) 2 pages.
Kirkpatrick, K., "Electronic Exchange 2000, The," Computer Shopper, (Nov. 1999) 5 pages.
Anon., "InstantService.com Teams with Island Data to provide Integrated Solution for Online Customer Response," Business Wire, (May 22, 2000) 3 pages.
Kersnar, S., "Countrywide Offers Proprietary Technology for Online Wholesale Lending," National Mortgage News, vol. 24, No. 38, (Jun. 5, 2000) 2 pages.
Douglas Armstrong, Firstar Web site helps add up future, Milwaukee Journal Sentinel, (Mar. 28, 1996) 3 pages.
redhat .com downloaded on Jul. 23, 2006.
apache.org downloaded on Jul. 23, 2006.
mysql.com downloaded on Jul. 23, 2006.
developer.com downloaded on Jul. 23, 2006.
Canter, Ronald S., "Lender Beware-Federal Regulation of Consumer Credit", Credit World, vol. 81, No. 5, pp. 16-20, (May 1993).
Staff, "On-Line System Approves Loans While Customer Waits," Communication News, vol. 31, Issue 9, (Sep. 1994) 3 pages.
"Low-Rent Loan Officer In a Kiosk", Bank Technology News vol. 8 No. 2, p (Feb. 1995) 2 pages.
Duclaux, Denise, "A Check for $5,000 in Ten Minutes", ABA Banking Journal, vol. 87, No. 8, p. 45, AUQ. (1995) 2 pages.
"World Wide Web Enhances Customer's Choice", Cards International, No. 143, p. 9, (Nov. 1995) 2 pages.
Wells Fargo Launches First Real-Time, Online Home Equity Credit Decision-Making Service, Business Wire, (Jun. 3, 1998), Dialog_File 621: New Product Announcement, 3 pages.
Handley, John, "Credit Review Lets the Numbers Do the Talking in Home Mortgage Game", Chicago Tribune (Jul. 1998) 3 pages.
Sherman, Lee, "Wells Fargo Writes a New Online Script", Interactive Week, vol. 5, No. 31, p. 29, (Aug. 1998) 2 pages.
Calvey, Mark, "Internet Gives Bankers a Snappy Comeback", San Francisco Business Times, vol. 13, No. 5, p. 3 (Sep. 1998) 2 pages.
McCormick, Linda, "Users of Credit Scoring Face Tough Rules on Notification", American Banker, Dialog File 625: American Banker Publications, (Mar. 21, 1982) 2 pages.
What the Credit Bureau is Saying About You: If a Mistake Sneaks Into Your Record, You May Not Know About it Until You Get Turned Down for Credit, Changing Times, vol. 37, p. 56, (Jul. 1983) 2 pages.
McShane. Peter K., "Got Financing?", Business Journal Serving Southern Tier, CNY, Mohawk Valley, Finger Lakes. North, vol. 11, Issue 19, p. 9, (Sep. 15, 1997) 3 pages.
Borowsky, Mark, "The Neural Net: Predictor of Fraud or Victim of Hype?", Bank Technology News DialoQ File 16:PROMT, p. 7 (Sep. 1993) 2 pages.
FICO http://houseloans.idis.com/fico (2009) 1 page.
Altavista: search, FICO http://www.altavista.com (2001) 3 pages.
What Do FICO Scores Mean to Me?, http://www.sancap.com. (1999) 3 pages.
What is a FICO Score?, http://www.aspeenloan.com (2009) 1 page.
"Credit", The New Encyclopedia Britannica vol. 3 p. 722. (1994) 3 pages.
"Creditnet.com—An Online Guide to Credit Cards", http://www.creditnet/com. (1999) 1 page.
"Phillips 66 Introduces Mastercard with Rebate Feature", PR Newswire, p914NY067, (Sep. 14, 1995) 1 page.

Anon, "VAR Agreement Expands Credit Bureau Access.", (CCS America, Magnum Communications Ltd expand CardPac access, Computers in Banking, v6, n10, (1) (Oct. 1989) 2 pages.
Wortmann, Harry S., "Reengineering Update—Outsourcing: An Option Full of Benefits and Responsibilities", American Banker, (Oct. 24, 1994), p. 7A vol. 159, No. 205 3 pages.
Anon. "To Boost Balances, AT&T Renews No-Fee Universal Credit Card Offer", Gale Group Newsletter, V 10, N. 13, (Mar. 30, 1992) 2 pages.
Anon. "Citgo Puts a New Spin on the Cobranded Oil Card", Credit Card News, p. 4, (Nov. 1, 1995) 2 pages.
Anon. "Microsoft Targets More than PIM Market with Outlook 2000," Computer Reseller News, N. 805 p. 99, (Aug. 31, 1998) 2 pages.
Chesanow, Neil, "Pick the Right Credit Cards-and use them wisely", Medical Economics, v. 75, n. 16, p. 94, (Aug. 24, 1998) 4 pages.
Friedland, Marc, "Credit Scoring Digs Deeper into Data", Credit World, v. 84, n. 5 p. 19-23, (May 1996) 5 pages.
Hollander, Geoffrey, "Sibling Tool Personator 3 untangles File Formats", InfoWorld, v20, n5, pp. 102 (Feb. 2, 1998) 2 pages.
Kantrow, Yvette D., "Banks Press Cardholders to Take Cash Advances", American Banker, v. 157, n. 18 pp. 1-2. (Jan. 28, 1992) 2 pages.
Lotus News Release: "Lotus Delivers Pre-Release of Lotus Notes 4.6 Client Provides Compelling New Integration with Internet Explorer", (May 20, 1997) 2 pages.
Stetenfeld, Beth, "Credit Scoring: Finding the Right Recipe", Credit Union Management, v. 17, n 11, pp. 24-26 (Nov. 1994).
Block, Valerie, "Network Assembles Card Issuers at an Internet Site", Am. Banker, V160, (1998) 1 page.
CreditNet Financial Network http://consumers.creditnet.com (1999) 1 page.
Anon., "Lending Tree: Lending Tree Provides Borrowers Fast and Easy Online Access to Multiple Loan Offers," Business Wire, Jun. 23, 1998, 2 pages.
Anon, Regulation Z Commentary Amendments, Retail Banking Digest, vol. 15, No. 2, p. 17-18, (Mar.-Apr. 1995).
Anon, San Diego Savings Association Offers Customers No-Fee Visa Product, Card News, (Feb. 29, 1988) 1 page.
Bloom, J.K., "For This New Visa, Only Web Surfers Need Apply," American Banker, vol. 1163, No. 34 12 (Feb. 20, 1998) 2 pages.
Harney, K.R., "Realty Brokers, Lenders Face Restrictions," Arizona Republic, Final Chaser edition, Sun Living section, (Feb. 10, 1991) 2 pages.
Higgins, K.T., "Mr. Plastic Joins the Marketing Team," Credit Card Management, vol. 6, No. 3, pp. 26-30, Jun. 1993.
Microsoft Press Computer Dictionary, Third Edition, Microsoft Press, Redmond, 1997, 4 pages.
Whiteside, D.E., "One Million and Counting," Collections and Credit Risk, vol. 1, No. 11 (Nov. 1996) 5 pages.
Fickenscher, L., "Providian Undercuts rivals with 7.9% Rate Offer," American banker, vol. 163, Oct. 8, 1998, 2 pages.
Fargo, J., "The Internet Specialists," Credit Card Management, vol. 11, No. 10, pp. 38-45, Jan. 1999.
Lemay, T., "Browsing for a Mortgage a Click away," Financial Post, (Jan. 15, 2000) 1 page.
Wijnen, R., "Banks Fortify Online Services," Bank Technology News, vol. 13, No. 3, Mar. 2000, 3 pages.
Anon. "IAFC Launches NextCard, The First True Internet VISA," Business Wire, New York: (Feb. 6, 1998), 3 pages.
Lazarony, Lucy, "Only Online Applicants Need Apply," Bank Advertising News, North Palm Beach, Mar. 23, 1998, vol. 21, Issue 15, 3 pages.
FIData, Inc., News & Press Releases, "Instant Credit Union Loans via the Internet," http://web.archive.org/web/19990221115203/www.fidata-inc.com/news-pr01.htm (1999) 2 pages.
FIData, Inc., Press Releases, "Instant Loan Approvals via the Internet," http://www.fidata-inc.com/news/pr_040198.htm, (Apr. 1, 1998) 2 pages.
Staff, "On-Line System Approves Loans While Customer Waits"—Abstract, Communication News, vol. 31, Issue 9, (Sep. 1994) 3 pages.
Anon. "Affordable Lending Systems Now Available for Smaller Financial Institutions," Business Wire, (May 18, 1998), 2 pages.

(56) References Cited

OTHER PUBLICATIONS

Nexis—All News Sources—Examiner's NPL Search Results in U.S. Appl. No. 11/932,498, included with Office Action dated Oct. 8, 2008, 14 pages.
"Sample Experian Credit Report" by Consumer Information consumerinfo.com (Jul. 9, 1998) 4 pages.
Plaintiffs Original Complaint, Nextcard, LLC v. Liveperson, Inc.; Civil Action No. 2:08-cv-00184-TJW, In the U.S. District Court for the Eastern District of Texas, Marshall Division, filed Apr. 30, 2008 (7 pages).
Amended Complaint and Jury Demand; Liveperson, Inc. v. Nextcard, LLC, et al.; Civil Action No. 08-062 (GMS), in the U.S. District Court for the District of Delaware, filed Mar. 18, 2008 (5 pages).
Plaintiffs Second Amended Complaint; Nextcard, LLC v. American Express Company, et al.; Civil Action No. 2:07-cv-354 (TJW); In the U.S. District Court for the Eastern District of Texas, Marshall Division, filed Apr. 9, 2008 (12 pages).
Defendants HSBC North America Holdings Inc.'s and HSBC USA Inc's Answer, Affirmative Defenses and Counterclaims to Plaintiffs Second Amended Complaint; Nextcard, LLC v. American Express Company, et al.; Civil Action No. 2:07-cv-354 (TJW); In the U.S. District Court for the Eastern District of Texas, Marshall Division filed (Apr. 28, 2008), 13 pages.
Answer and Counterclaims of Defendant DFS Services LLC; Nextcard, LLC v. American Express Company, et al.; Civil Action No. 2:07-cv-354 (TJW); In the U.S. District Court for the Eastern District of Texas, Marshall Division, filed Apr. 28, 2008 (13 pages).
Defendant The PNC Financial Services Group, Inc.'s Answer and Affirmative Defenses to Second Amended Complaint; Nextcard, LLC v. American Express Company, et al.; Civil Action No. 2:07-cv-354 (TJW); In the U.S. District Court for the Eastern District of Texas, Marshall Division, filed Apr. 28, 2008, 10 pages.
Plaintiffs Second Amended Reply to Counterclaims of Defendants HSBC North America Holdings Inc. and HSBC USA Inc.; Nextcard, LLC v. American Express Company, et al.; Civil Action No. 2:07-cv-354 (TJW); In the U.S. District Court for the Eastern District of Texas, Marshall Division, filed May 14, 2008, 5 pages.
Plaintiffs Second Amended Reply to Counterclaims of Defendant DFS Services LLC; Nextcard, LLC v. American Express Company, et al.; Civil Action No. 2:07-cv-354 (TJW); In the U.S. District Court for the Eastern District of Texas, Marshall Division, filed May 14, 2008 (71 pages).
Plaintiffs Second Amended Reply to Counterclaims of Defendant American Express Company; Nextcard, LLC v. American Express Company, et al.; Civil Action No. 2:07-cv-354 (TJW); In the U.S. District Court for the Eastern District of Texas, Marshall Division, filed (May 8, 2008), 8 pages.
Justin Hibbard, Gregory Dalton, Mary E Thyfault. (Jun. 1998). "Webbased customer care." Information Week, (684) 18-20, 3 pages.
Kim S. Nash "Call all Customers." Computerworld, 32 (1), 25-28 (Dec. 1997), 2 pages.
PRN: "First American Financial Acquires Tele-Track Inc., "PR Newswire, (May 11, 1999), Proquest #41275773, 2 pages.
Young, Deborah, "The Information Store," (Sep. 15, 2000), Wireless Review, pp. 42, 44, 46, 48, 50.
Whiting et al., "Profitable Customers," (Mar. 29, 1999), Information Week, Issue 727, pp. 44, 45, 48, 52, 56.
Bayer, Judy, "A Framework for Developing and Using Retail Promotion Response Models," Cares Integrated Solutions, retrieved from www.ceresion.com (2007) 5 pages.
Bayer, Judy, "Automated Response Modeling System for Targeted Marketing," (Mar. 1998), Ceres Integrated Solutions, 5 pages.
Sweet et al., "Instant Marketing," (Aug. 12, 1999), Information Week, pp. 18-20.
SmartKids.com "Chooses Quadstone—The Smartest Customer Data Mining Solution," (Jul. 31, 2000), Business Wire, 2 pages.
"NCR's Next Generation Software Makes True Customer Relationship Management a Reality," (Jul. 26, 1999) PR Newswire, 3 pages.
"Quadstone System 3.0 Meets New Market Demand for Fast, Easy-to-Use Predictive Analysis for CRM," (May 22, 2000) Business Wire, 3 pages.
"Net Perceptions Alters Dynamics of Marketing Industry with Introduction of Net Perceptions for Call Centers," (Oct. 12, 1998) PR Newswire, 3 pages.
"Ceres Targeted Marketing Application," Ceres Integrated Solutions: retrieved from www.ceresios.com/Product/index.htm (2007) 3 pages.
Prince, C. J., E:business: A Look at the Future, Chief Executive, vol. 154, (Apr. 2000), pp. 10-11.
Oikarinen et al. "Internet Relay Chat Protocol" RFC-1459, pp. 1-65, (May 1993).
eDiet.com: Personalized Diets, Fitness, and Counseling, (May 3, 1998), pp. 1-15.
Fiszer, Max; "Customizing an inbound call-center with skills-based routing," Telemarketing & Call Center Solutions, (Jan. 1997), v15i7 p. 24; Proquest #11267840, 5 pages.
"ESL Federal Credit Union Inaugurates Internet Target Marketing." PR Newswire p. 4210 (Oct. 6, 1998), 3 pages.
"Welcome to eStara—The Industry Leader in Click to Call and Call Tracking Solutions," e-Stara, Inc., retrieved from www.estara.com on Mar. 21, 2013, 1 page.
"Push to Talk Live Now! From your website" iTalkSystem, Inc., retrieved from www.italksystems.com on Mar. 21, 2013, 1 page.
Richardson et al., "Predicting Clicks: Estimating the Click-Through Rate for New Ads," (May 2007) 9 pages.
"Welcome to Keen" retrieved from www.archive.org/web/20010302014355/http://www.keen.com/on Jan. 25, 2013, 1 page.
Christophe Destruel, Herve Luga, Yves Duthen, Rene Caubet. "Classifiers based system for interface evolution." Expersys Conference, 265-270 (1997), 6 pages.
Ulla de Stricker, Annie Joan Olesen. "Is Management Consulting for You?" Searcher, 48-53 (Mar. 2005), 6 pages.
Humberto T. Marques Neto, Leonardo C.D. Rocha, Pedro H.C. Guerra, Jussara M. Almeida, Wagner Meira Jr., Virgilio A. F. Almeida. "A Characterization of Broadband User Behavior and Their E-Business Activities." ACM SIGMETRICS Performance Evaluation Review, 3-13 (2004), 11 pages.
Greg Bowman, Michael M. Danchak, Mary LaCombe, Don Porter. "Implementing the Rensselaer 80/20 Model in Professional Education." 30th ASEE/IEEE Frontiers In Education Conference, Session T3G (Oct. 18-21, 2000), 1 page.
Elizabeth Sklar Rozier, Richard Alterman. "Participatory Adaptation." CHI, 97, 261-262 (Mar. 22-27, 1997), 2 pages.
Frank White. "The User Interface of Expert Systems: What Recent Research Tells US." Library Software Review, vol. 13, No. 2, p. 91-98 (Summer 1994) 8 pages.
Frederick W. Rook, Michael L. Donnell. "Human Cognition and the Expert System Interface: Mental Models and Inference Explanations." IEEE Transactions on Systems, Man, and Cybernetics, vol. 23, No. 6, p. 1649-1661 (Nov./Dec. 1993), 13 pages.
Francois Bry et al., "Realizing Business Processes with ECA Rules: Benefits Challenges, Limits" (2006) Principles and Practive of Semantic Web Reasoning Lecture Notes in Computer Science; LNCS Springer Belin DE pp. 48-62 XP019042871, ISBN: 978-3540-39586-7.
International Search Report and Written Opinion for PCT Application No. PCT/US2013/041147, dated Jul. 30, 2013, 9 pages.
International Search Report and Written Opinion for PCT Application No. PCT/US2013/037086, dated Jul. 12, 2013, 9 pages.
International Search Report and Written Opinion for PCT Application No. PCT/US2013/29389, dated Jul. 24, 2013, 8 pages.
International Search Report and Written Opinion for PCT Application No. PCT/US2013/038212, dated Jul. 17, 2013, 11 pages.
International Search Report for PCT Application No. PCT/US03/41090, dated Sep. 1, 2004, 3 pages.
International Search Report for PCT Application No. PCT/US05/40012, dated Oct. 5, 2007, 2 pages.
International Preliminary Report on Patentability for PCT Application No. PCT/US2006/039630, dated Apr. 16, 2008, 4 pages.
International Search Report for PCT Application No. PCT/US2011/031239, dated Jul. 7, 2011, 3 pages.

(56) References Cited

OTHER PUBLICATIONS

International Search Report for PCT Application No. PCT/US2011/064946, dated Jun. 22, 2012, 3 pages.
International Preliminary Report on Patentability for PCT Application No. PCT/US2011/031239, dated Oct. 9, 2012, 8 pages.
International Search Report and Written Opinion for PCT Application No. PCT/US14/49822, dated Feb. 27, 2015, 11 pages.
Extended European Search Report dated Jul. 7, 2015 for European Patent Application No. 15161694.3; 8 pages.
International Preliminary Report on Patentability for PCT Application No. PCT/US2014/049822, dated Feb. 18, 2016, 7 pages.
International Search Report and Written Opinion for PCT Application No. PCT/US2016/035535, dated Aug. 8, 2016, 11 pages.
International Search Report and Written Opinion dated Nov. 7, 2017 for PCT Application No. PCT/US2017/046550, 16 pages.
Non-Final Office Action dated Dec. 11, 2008 for U.S. Appl. No. 11/394,078, 15 pages.
Final Office Action dated Jul. 9, 2009 for U.S. Appl. No. 11/394,078, 15 pages.
Non-Final Office Action dated Jan. 28, 2010 for U.S. Appl. No. 11/394,078, 14 pages.
Final Office Action dated Jul. 9, 2010 for U.S. Appl. No. 11/394,078, 16 pages.
Non-Final Office Action dated Feb. 1, 2011 for U.S. Appl. No. 11/394,078, 20 pages.
Final Office Action dated Aug. 2, 2011 for U.S. Appl. No. 11/394,078, 23 pages.
Non-Final Office Action dated May 16, 2012 for U.S. Appl. No. 11/394,078, 23 pages.
Final Office Action dated Jan. 25, 2013 for U.S. Appl. No. 11/394,078, 22 pages.
Non-Final Office Action dated Jun. 22, 2012 for U.S. Appl. No. 13/080,324, 9 pages.
Non-Final Office Action dated Aug. 15, 2012 for U.S. Appl. No. 12/967,782, 31 pages.
Non-Final Office Action dated Jul. 29, 2011 for U.S. Appl. No. 12/608,117, 20 pages.
Final Office Action dated Apr. 4, 2012 for U.S. Appl. No. 12/608,117, 25 pages.
Non-Final Office Action dated Apr. 24, 2004 for U.S. Appl. No. 09/922,753, 16 pages.
Final Office Action dated Oct. 14, 2004 for U.S. Appl. No. 09/922,753, 13 pages.
Non-Final Office Action dated May 17, 2005 for U.S. Appl. No. 09/922,753, 13 pages.
Non-Final Office Action dated Mar. 14, 2006 for U.S. Appl. No. 09/922,753, 13 pages.
Final Office Action dated Jul. 26, 2006 for U.S. Appl. No. 09/922,753, 13 pages.
Non-Final Office Action dated Aug. 13, 2008 for U.S. Appl. No. 09/922,753, 10 pages.
Final Office Action dated Apr. 23, 2009 for U.S. Appl. No. 09/922,753, 11 pages.
Non-Final Office Action dated Jul. 21, 2009 for U.S. Appl. No. 09/922,753, 10 pages.
Final Office Action dated Feb. 18, 2010 for U.S. Appl. No. 09/922,753, 9 pages.
Non-Final Office Action dated Apr. 25, 2011 for U.S. Appl. No. 09/922,753, 9 pages.
Final Office Action dated Nov. 25, 2011 for U.S. Appl. No. 09/922,753, 10 pages.
Non-Final Office Action dated Aug. 7, 2007 for U.S. Appl. No. 10/980,613, 16 pages.
Non-Final Office Action dated May 15, 2008 for U.S. Appl. No. 10/980,613, 23 pages.
Non-Final Office Action dated Apr. 30, 2012 for U.S. Appl. No. 12/504,265, 16 pages.
Final Office Action dated Aug. 28, 2012 for U.S. Appl. No. 12/504,265, 28 pages.
Final Office Action dated Feb. 14, 2013 for U.S. Appl. No. 13/080,324, 11 pages.
Non-Final Office Action dated Mar. 30, 2013 for U.S. Appl. No. 11/360,530, 23 pages.
Final Office Action dated Apr. 11, 2013 for U.S. Appl. No. 12/967,782, 18 pages.
Non-Final Office Action dated May 10, 2013 for U.S. Appl. No. 13/563,708, 20 pages.
Non-Final Office Action dated Jun. 12, 2013 for U.S. Appl. No. 12/608,117, 56 pages.
Non-Final Office Action dated Jun. 20, 2013 for U.S. Appl. No. 13/157,936, 19 pages.
Non-Final Office Action dated Jun. 27, 2013 for U.S. Appl. No. 12/504,265, 11 pages.
Non-Final Office Action dated Jul. 8, 2013 for U.S. Appl. No. 13/413,197, 10 pages.
Final Office Action dated Oct. 21, 2013 for U.S. Appl. No. 12/504,265 14 pages.
Non-Final Office Action dated Oct. 30, 2013 for U.S. Appl. No. 13/961,072, 10 pages.
Non-Final Office Action dated Dec. 5, 2013 for U.S. Appl. No. 12/967,782, 14 pages.
Non-Final Office Action dated Dec. 4, 2014 for U.S. Appl. No. 14/275,698, 6 pages.
Notice of Allowance dated Jan. 3, 2014 for U.S. Appl. No. 11/360,530, 29 pages.
Final Office Action dated Jan. 22, 2014 for U.S. Appl. No. 12/608,117, 45 pages.
Final Office Action dated Jan. 27, 2014 for U.S. Appl. No. 13/563,708, 35 pages.
Non-Final Office Action dated Jan. 30, 2014 for U.S. Appl. No. 13/413,158, 19 pages.
Notice of Allowance dated Feb. 12, 2014 for U.S. Appl. No. 13/157,936, 33 pages.
Final Office Action dated Feb. 19, 2014 for U.S. Appl. No. 13/961,072, 35 pages.
Non-Final Office Action dated Feb. 20, 2014 for U.S. Appl. No. 10/980,613, 43 pages.
Notice of Allowance dated Feb. 28, 2014 for U.S. Appl. No. 09/922,753, 13 pages.
Notice of Allowance dated Mar. 25, 2014 for U.S. Appl. No. 12/504,265 31 pages.
Notice of Allowance dated Mar. 31, 2014 for U.S. Appl. No. 12/725,999, 41 pages.
Notice of Allowance dated Mar. 30, 2015 for U.S. Appl. No. 14/275,698, 11 pages.
Notice of Allowance dated Apr. 1, 2014 for U.S. Appl. No. 13/413,197, 32 pages.
Non-Final Office Action dated Jul. 17, 2014 for U.S. Appl. No. 11/394,078, 41 pages.
Non-Final Office Action dated Jul. 31, 2014 for U.S. Appl. No. 13/080,324, 38 pages.
Notice of Allowance dated Aug. 18, 2014 for U.S. Appl. No. 12/967,782, 43 pages.
Non-Final Office Action dated Aug. 21, 2014 for U.S. Appl. No. 10/980,613, 43 pages.
Final Office Action dated Mar. 12, 2015 for U.S. Appl. No. 13/080,324, 13 pages.
Non-Final Office Action dated Mar. 13, 2015 for U.S. Appl. No. 13/841,434, 26 pages.
Non-Final Office Action dated Apr. 9, 2015 for U.S. Appl. No. 13/830,719, 24 pages.
Final Office Action dated Apr. 7, 2015 for U.S. Appl. No. 11/394,078, 18 pages.
Non-Final Office Action dated Apr. 6, 2015 for U.S. Appl. No. 14/322,736, 13 pages.
Non-Final Office Action dated May 7, 2015 for U.S. Appl. No. 13/829,708, 16 pages.
Final Office Action dated May 8, 2015 for U.S. Appl. No. 10/980,613, 18 pages.
Non-Final Office Action dated May 13, 2015 for U.S. Appl. No. 14/317,346, 21 pages.

(56) References Cited

OTHER PUBLICATIONS

Non-Final Office Acton dated Jun. 2, 2015 for U.S. Appl. No. 12/608,117, 26 pages.
First Action Pre-Interview Communication dated Jun. 19, 2015 for U.S. Appl. No. 14/244,830, 7 pages.
Non-Final Office Action dated Jul. 20, 2015 for U.S. Appl. No. 14/711,609; 12 pages.
Non-Final Office Action dated Jul. 20, 2015 for U.S. Appl. No. 14/500,537; 12 pages.
Final Office Action dated Jul. 31, 2015 for U.S. Appl. No. 14/317,346, 13 pages.
Final Office Action dated Aug. 10, 2015 for U.S. Appl. No. 13/961,072, 12 pages.
Non-Final Office Action dated Aug. 14, 2015 for U.S. Appl. No. 14/543,397, 12 pages.
Non-Final Office Action dated Aug. 18, 2015 for U.S. Appl. No. 14/570,963, 23 pages.
Non-Final Office Action dated Aug. 27, 2015 for U.S. Appl. No. 11/394,078, 21 pages.
Non-Final Office Action dated Sep. 11, 2015 for U.S. Appl. No. 14/500,502; 12 pages.
Final Office Action dated Sep. 18, 2015 for U.S. Appl. No. 14/288,258, 17 pages.
Notice of Allowance dated Sep. 18, 2015 for U.S. Appl. No. 14/244,830, 11 pages.
First Action Interview Pilot Program Pre-Interview Communication dated Oct. 21, 2015 for U.S. Appl. No. 14/313,511, 3 pages.
Final Office Action dated Oct. 22, 2015 for U.S. Appl. No. 13/830,719, 29 pages.
Final Office Action dated Nov. 10, 2015 for U.S. Appl. No. 13/841,434; 30 pages.
Final Office Acton dated Nov. 17, 2015 for U.S. Appl. No. 12/608,117, 32 pages.
Non-Final Office Action dated Dec. 4, 2015 for U.S. Appl. No. 10/980,613 21 pages.
Non-Final Office Action dated Dec. 24, 2015 for U.S. Appl. No. 14/317,346, 15 pages.
Notice of Allowance dated Dec. 30, 2015 for U.S. Appl. No. 14/322,736, 9 pages.
Non-Final Office Action dated Jan. 5, 2016 for U.S. Appl. No. 14/245,400, 33 pages.
Notice of Allowance dated Jan. 7, 2016 for U.S. Appl. No. 14/313,511, 5 pages.
First Action Pre-Interview Communication dated Jan. 12, 2016 for U.S. Appl. No. 14/753,496, 3 pages.
Notice of Allowance dated Jan. 20, 2016 for U.S. Appl. No. 13/829,708, 11 pages.
Final Office Action dated Jan. 29, 2016 for U.S. Appl. No. 14/711,609; 15 pages.
Final Office Action dated Jan. 29, 2016 for U.S. Appl. No. 14/500,537; 15 pages.
Non-Final Office Action dated Feb. 12, 2016 for U.S. Appl. No. 13/080,324, 15 pages.
Notice of Allowance dated Mar. 16, 2016 for U.S. Appl. No. 14/582,550; 9 pages.
Notice of Allowance dated Mar. 21, 2016 for U.S. Appl. No. 14/753,496; 5 pages.
Final Office Action dated Apr. 14, 2016 for U.S. Appl. No. 10/980,613, 21 pages.
Final Office Action dated Apr. 21, 2016 for U.S. Appl. No. 14/317,346, 17 pages.
Non-Final Office Action dated Apr. 22, 2016 for U.S. Appl. No. 14/288,258 11 pages.
Notice of Allowance dated Apr. 22, 2016 for U.S. Appl. No. 11/394,078, 16 pages.
Non-Final Office Action dated May 12, 2016 for U.S. Appl. No. 13/961,072, 12 pages.
Non-Final Office Acton dated May 23, 2016 for U.S. Appl. No. 12/608,117, 35 pages.
Final Office Action dated Jun. 9, 2016 for U.S. Appl. No. 14/543,397, 18 pages.
Final Office Action dated Jun. 17, 2016 for U.S. Appl. No. 14/570,963, 18 pages.
Notice of Allowance dated Jun. 23, 2016 for U.S. Appl. No. 13/830,719; 26 pages.
Final Office Action dated Jun. 28, 2016 for U.S. Appl. No. 14/500,502, 10 pages.
Final Office Action dated Jul. 12, 2016 for U.S. Appl. No. 14/245,400, 36 pages.
First Action Pre-Interview Communication dated Jul. 14, 2016 for U.S. Appl. No. 14/970,225.
Final Office Action dated Sep. 8, 2016 for U.S. Appl. No. 13/080,324, 15 pages.
Notice of Allowance dated Sep. 21, 2016 for U.S. Appl. No. 14/711,609, 22 pages.
Notice of Allowance dated Sep. 22, 2016 for U.S. Appl. No. 14/500,537, 19 pages.
Notice of Allowance dated Sep. 23, 2016 for U.S. Appl. No. 13/841,434, 15 pages.
Notice of Allowance dated Sep. 30, 2016 for U.S. Appl. No. 14/317,346, 19 pages.
Notice of Allowance dated Oct. 7, 2016 for U.S. Appl. No. 14/288,258, 10 pages.
Non-Final Office Action dated Jan. 13, 2017 for U.S. Appl. No. 14/543,397, 19 pages.
Non-Final Office Action dated Jan. 9, 2017 for U.S. Appl. No. 14/570,963, 16 pages.
Notice of Allowance dated Jan. 13, 2017 for U.S. Appl. No. 15/294,441, 10 pages.
Pre-Interview First Office Action dated Apr. 3, 2017 for U.S. Appl. No. 15/384,895, 7 pages.
Non-Final Office Action dated Mar. 27, 2017 for U.S. Appl. No. 14/245,400; 43 pages.
Notice of Allowance dated May 22, 2017 for U.S. Appl. No. 13/080,324; 10 pages.
Non-Final Office Action dated Jul. 17, 2017 for U.S. Appl. No. 15/131,777; 11 pages.
Non-Final Office Action dated Sep. 7, 2017 for U.S. Appl. No. 15/273,863, 29 pages.
Pre-Interview First Office Action dated Sep. 11, 2017 for U.S. Appl. No. 15/409,720, 6 pages.
Final Office Action dated Sep. 22, 2017 for U.S. Appl. No. 14/543,397, 18 pages.
Non-Final Office Action dated Sep. 25, 2017 for U.S. Appl. No. 15/632,069, 12 pages.
Final Office Action dated Oct. 6, 2017 for U.S. Appl. No. 14/570,963, 17 pages.
Notice of Allowance dated Oct. 2, 2017 for U.S. Appl. No. 15/595,590, 9 pages.
Notice of Allowance dated Dec. 8, 2017 for U.S. Appl. No. 15/409,720, 9 pages.
Final Office Action dated Jan. 4, 2018 for U.S. Appl. No. 14/245,400; 22 pages.
Final Office Action dated Jan. 9, 2018 for U.S. Appl. No. 15/384,895, 10 pages.
Non-Final Office Action dated Feb. 8, 2018 for U.S. Appl. No. 14/570,963; 25 pages.
Non-Final Office Action dated Mar. 19, 2018 for U.S. Appl. No. 15/084,133; 16 pages.
Non-Final Office Action dated Jun. 4, 2018 for U.S. Appl. No. 15/682,186; 13 pages.
Non-Final Office Action dated Jul. 12, 2018 for U.S. Appl. No. 15/860,378; 7 pages.
Final Office Action dated Jul. 11, 2018 for U.S. Appl. No. 15/273,863; 29 pages.
Notice of Allowance dated Jul. 23, 2018 for U.S. Appl. No. 15/171,525; 14 pages.
Notice of Allowance dated Sep. 12, 2018 for U.S. Appl. No. 15/213,776; 8 pages.
Non-Final Office Action dated Oct. 4, 2018 for U.S. Appl. No. 15/389,598; 21 pages.

(56) References Cited

OTHER PUBLICATIONS

Final Office Action dated Dec. 13, 2018 for U.S. Appl. No. 14/570,963; 32 pages.
Non-Final Office Action dated Jan. 24, 2019 for U.S. Appl. No. 15/273,863; 29 pages.
Notice of Allowance dated Feb. 1, 2019 for U.S. Appl. No. 15/084,133; 8 pages.
Notice of Allowance dated Feb. 28, 2019 for U.S. Appl. No. 15/860,378; 7 pages.
Non-Final Office Action dated Mar. 7, 2019 for U.S. Appl. No. 15/682,186; 12 pages.
Final Office Action dated Apr. 25, 2019 for U.S. Appl. No. 14/245,400; 25 pages.
Final Office Action dated May 14, 2019 for U.S. Appl. No. 15/389,598; 19 pages.
Non-Final Office Action dated Jun. 25, 2019 for U.S. Appl. No. 16/218,052; 8 pages.
Non-Final Office Action dated Aug. 7, 2019 for U.S. Appl. No. 16/353,321; 10 pages.
Final Office Action dated Aug. 7, 2019 for U.S. Appl. No. 15/273,863; 33 pages.
Notice of Allowance dated Aug. 14, 2019 for U.S. Appl. No. 15/384,895; 8 pages.
Non-Final Office Action dated Sep. 20, 2019 for U.S. Appl. No. 15/682,186; 13 pages.
Non-Final Office Action dated Dec. 4, 2019 for U.S. Appl. No. 15/182,310; 8 pages.
Non-Final Office Action dated Dec. 31, 2019 for U.S. Appl. No. 16/026,603; 7 pages.
Final Office Action dated Nov. 4, 2019 for U.S. Appl. No. 16/353,321; 14 pages.
Non-Final Office Action dated Mar. 17, 2020 for U.S. Appl. No. 15/273,863; 25 pages.
Final Office Action dated Apr. 9, 2020 for U.S. Appl. No. 16/218,052; 15 pages.
Final Office Action dated Jun. 26, 2020 for U.S. Appl. No. 15/682,186; 15 pages.
Non-Final Office Action dated Jul. 10, 2020 for U.S. Appl. No. 16/420,458; 5 pages.
Final Office Action dated Jul. 20, 2020 for U.S. Appl. No. 14/570,963; 43 pages.
Final Office Action dated Aug. 6, 2021 for U.S. Appl. No. 15/182,310; 9 pages.
Final Office Action dated Aug. 6, 2021 for U.S. Appl. No. 14/245,400; 22 pages.
Non-Final Office Action dated Oct. 30, 2020 for U.S. Appl. No. 14/570,963; 35 pages.
Non-Final Office Action dated Nov. 10, 2020 for U.S. Appl. No. 16/218,052; 16 pages.
Non-Final Office Action dated Dec. 28, 2020 for U.S. Appl. No. 14/570,963; 16 pages.
Non-Final Office Action dated Mar. 30, 2021 for U.S. Appl. No. 15/182,310; 8 pages.

* cited by examiner

DYNAMIC USER INTERFACE CUSTOMIZATION

CROSS REFERENCE TO RELATED APPLICATION

This application is a continuation of U.S. application Ser. No. 15/389,598 filed Dec. 23, 2016 which is a continuation of U.S. application Ser. No. 13/841,434 filed Mar. 15, 2013, which claims priority to U.S. Provisional Application No. 61/638,825, filed Apr. 26, 2012, the disclosure of each of which is incorporated herein by reference in its entirety for all purposes.

TECHNICAL FIELD

The technical field relates generally to computer-based methods and apparatuses, including computer program products, for dynamic user interface customization, and to dynamic communication and collaboration between businesses and consumers through a customizable user interface.

BACKGROUND

With the continued growth of internet use by consumers, live online help services have become increasingly important. Website providers can incorporate online chat options into their website page(s) to offer an additional level of customer service to their users (e.g., in addition to the more traditional fillable information request forms, frequently asked questions pages, etc.). For example, many websites include a "click to chat" option, which a website user can use to engage in interactive chat with a live help agent. When the user clicks the "click to chat" button, a chat user interface is presented to the website user, and through the interface, the user is able to exchange chat messages with the help agent. As another example, websites can include embedded code to automatically display a message to the user that includes a "click to chat" button (e.g., after the user has been idle on a page for a predetermined amount of time). There are several additional methods to engage a website user, and facilitate live interaction between the user and an agent. Regardless of the engagement method used, the help agent can interact with the user through the chat to answer the web site user's questions, help navigate the user through the website, suggest products, and/or the like.

While online chat has become an increasingly common method used by website owners to serve users, online chat may not scale well to address each individual user's needs. For example, if the live agent cannot successfully help a web site user via the chat, the chat user interface may not include sufficient functions and/or features to successfully address the user's problem. Further, website providers currently face limitations imposed by the chat user interface itself. For example, when current chat interfaces are used, it is generally not possible to add any specific functionality to address the individual needs of the website providers or website user.

Additionally, once a user is engaged with a particular communication channel (e.g., text chat, voice, video, etc.), then it is usually difficult to switch among other communication modalities without starting a new engagement with the user. For example, once a user is engaged in an online chat session, a new communication channel (e.g., with separate user interfaces, equipment, etc.) is often required to change to a different communication modality (e.g., to set up a video chat instead of a standard text chat).

SUMMARY OF THE INVENTION

This disclosure provides a computer-implemented method, a computer-program product, and a computer-implemented system, each of which may be used to dynamically customize a user interface. The method may comprise the steps of storing, at a computing device, multiple functions for a user interface, wherein each of the stored functions is configured to operate on a remote user device, in conjunction with the user interface, and wherein the user interface is configured to operate at the remote user device, transmitting a first set of data to the remote user device, wherein the first set of data causes a first one of the stored functions to operate on the remote user device, wherein operating on the remote user device includes operating in conjunction with the user interface, receiving, at the computing device, interaction data associated with user interactions with the user interface, the interactions occurring at the remote user device, identifying a second set of data based on the received interaction data, wherein the second set of data is identified at the computing device; and transmitting the second set of data from the computing device to the remote user device, wherein the second set of data causes a second one of the stored functions to operate on the remote user device, in conjunction with the user interface.

The system may include a processor which is configured to perform operations such as storing, at a computing device, multiple functions for a user interface, wherein each of the stored functions is configured to operate on a remote user device, in conjunction with the user interface, and wherein the user interface is configured to operate at the remote user device, transmitting a first set of data to the remote user device, wherein the first set of data causes a first one of the stored functions to operate on the remote user device, wherein operating on the remote user device includes operating in conjunction with the user interface, receiving, at the computing device, interaction data associated with user interactions with the user interface, the interactions occurring at the remote user device, identifying a second set of data based on the received interaction data, wherein the second set of data is identified at the computing device; and transmitting the second set of data from the computing device to the remote user device, wherein the second set of data causes a second one of the stored functions to operate on the remote user device, in conjunction with the user interface.

The computer-program product may include instructions for causing a computing device to perform operations including storing, at the computing device, multiple functions for a user interface, wherein each of the stored functions is configured to operate on a remote user device, in conjunction with the user interface, and wherein the user interface is configured to operate at the remote user device, transmitting a first set of data to the remote user device, wherein the first set of data causes a first one of the stored functions to operate on the remote user device, wherein operating on the remote user device includes operating in conjunction with the user interface, receiving, at the computing device, interaction data associated with user interactions with the user interface, the interactions occurring at the remote user device, identifying a second set of data based on the received interaction data, wherein the second set of data is identified at the computing device; and transmitting the second set of data from the computing device to the remote user device, wherein the second set of data causes a second one of the stored functions to operate on the remote user device, in conjunction with the user interface.

The computerized methods and apparatus disclosed herein allow dynamic customization of a user interface (e.g., a chat user interface) by dynamically adding interactive elements or functions (e.g., widgets) to customize the user interface based on a user's unique experience. A unified communication channel allows seamless integration among various communication modalities, such as chat, voice, and video communication channels. A brief summary of various exemplary embodiments is presented. Some simplifications and omissions may be made in the following summary, which is intended to highlight and introduce some aspects of the various exemplary embodiments, but not limit the scope of the invention. Detailed descriptions of a preferred exemplary embodiment adequate to allow those of ordinary skill in the art to make and use the inventive concepts will follow in the later sections.

In one embodiment, a computerized method is featured. The computerized method is for dynamically customizing a user interface. The method includes storing, by a computing device, a set of functions for a user interface, whereby each function is configured so that it can be added to the user interface. The method includes transmitting, by the computing device, a first set of data to a remote device that causes the user interface to be displayed on the remote device with a predetermined subset of functions from the set of functions, wherein one or more functions from the predetermined subset of functions are displayed as a selectable item at the user interface, such that a user can select, activate or engage the function. The method includes receiving, by the computing device, interaction data indicative of a user's interactions with the user interface. The method includes transmitting, by the computing device, a second set of data to the remote device that causes the user interface to dynamically add a new function from the set of functions to the user interface based on the interaction data, wherein the new function is displayed as a selectable item in the user interface, such that the function may be selected for use by the user.

In another embodiment, a computer program product, tangibly embodied in a non-transitory computer readable medium, is featured. The computer program product includes instructions configured to cause a data processing apparatus to store a set of functions for a user interface, the set of functions including functions which can be added to the user interface. The computer program product includes instructions configured to cause a data processing apparatus to transmit a first set of data to a remote device that causes the user interface to be displayed on the remote device with a predetermined subset of functions from the set of primary functions, wherein one or more functions from the predetermined set of functions are displayed as a selectable item in the user interface that a user can select to use the function associated with the primary function. The computer program product includes instructions being configured to cause a data processing apparatus to receive interaction data indicative of a user's interactions with the user interface. The computer program product includes instructions being configured to cause a data processing apparatus to transmit a second set of data to the remote device that causes the user interface to dynamically add a new function from the set of predetermined functions to the user interface based on the interaction data, wherein the new function is displayed as a selectable item in the user interface that the user can select to use a function associated with the new function.

In another embodiment, an apparatus is featured. The apparatus is for dynamically customizing a user interface. The apparatus including a processor and memory. The apparatus is configured to store a set of functions for a user interface, each function including a function that can be added to the user interface. The apparatus is configured to transmit a first set of data to a remote device that causes the user interface to be displayed on the remote device with a predetermined set of functions from the set of functions, wherein one or more functions from the predetermined set of functions are displayed as a selectable item in the user interface that a user can select to use the function associated with the function. The apparatus is configured to receive interaction data indicative of a user's interactions with the user interface. The apparatus is configured to transmit a second set of data to the remote device that causes the user interface to dynamically add a new function from the set of functions to the user interface based on the interaction data, wherein the new function is displayed as a selectable item in the user interface that the user can select to use a function associated with the new function.

In other examples, any of the aspects above can include one or more of the following features. The user interface can be a chat window facilitating chat between the user and a third party. A function from the set of functions can include an agent function that provides information about an agent that the user is in communication with, a shopping cart function that lists a set of products the user has selected while browsing a website, a data transfer function that downloads data to the user, allows a third party to push data to the user, or both, a video function that allows a user to control playback of video content, an audio function that allow a user to control playback of audio content, or any combination thereof.

In some examples, data indicative of a new function is received, wherein the new function includes a function that customizes the user interface for a third party, and adding the new function to the set of functions. The interaction data can be transmitted to an agent device. Action data indicative of the user taking an action associated with a function of a function on the user interface can be received, and the action data can be transmitted to the agent device.

In other examples, data selecting a function from the set of functions is received for addition to the user interface, and a third set of data is transmitted to the remote device that causes the user interface to dynamically add the selected function to the user interface, such that a function associated with the selected function is incorporated into the user interface, wherein prior to addition of the selected function to the user interface, the user interface did not include the function associated with the selected function. A third set of data can be transmitted to the remote device that causes the user interface to dynamically add a second new function from the set of functions to the user interface based on the interaction data, wherein the new function is not displayed as a selectable item in the user interface. The second new function can listen for one or more events from the user interface.

In other examples, transmitting the second set of data to the remote device includes transmitting the second set of data based on data indicative of a change of the user interface, data indicative of user interface behavior, or any combination thereof. An interface can be configured to receive data to design a user interface experience. The user interface experience can include a function, an interaction model between a first function and a second function, a behavior, a restriction for the user of the user interface, an agent the user is in communication with, or both, an automated interaction model, a set of permissions for the user, or any combination thereof.

The techniques described herein are techniques capable of being embodied in methods or apparatuses, and may provide or enable one or more of the following features. The techniques may allow functions to be dynamically added to, and/or removed from the user interface, such that the user interface can be altered to suit an individual user and/or solve problems or address needs associated with the user's interaction with the interface. Further, new functions can be designed for addition to the user interface to suit individual website provider needs. A single engagement with a customer can provide a unified communication channel that can seamlessly use any number of modalities to communicate with the customer. For example, various modalities such as chat communication channels, voice communication channels, video communication channels, and/or other communication channels can be seamlessly switched among during the single engagement with the customer.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems and methods are provided for dynamically customizing a user interface through adding, removing, configuring or making available functionality, features, capabilities or options. In accordance with this disclosure, the customization of the user interface may be done such that, from the perspective of the interface user, all customized elements are completely integrated with the interface. For example, in the case of a user and an agent in communication over chat, the techniques, methods and systems of this disclosure may enable the agent (and/or the engagement service that established the communication between the user and the agent) to dynamically add and/or remove functions (e.g., either with or without graphical interface component(s)) to/from the user interface to customize the user interface for the particular user, without any action required on the user's part. For example, an agent may be able to add a desktop sharing function, a video function, and/or other functions to the interface, as described herein.

Figure 1:
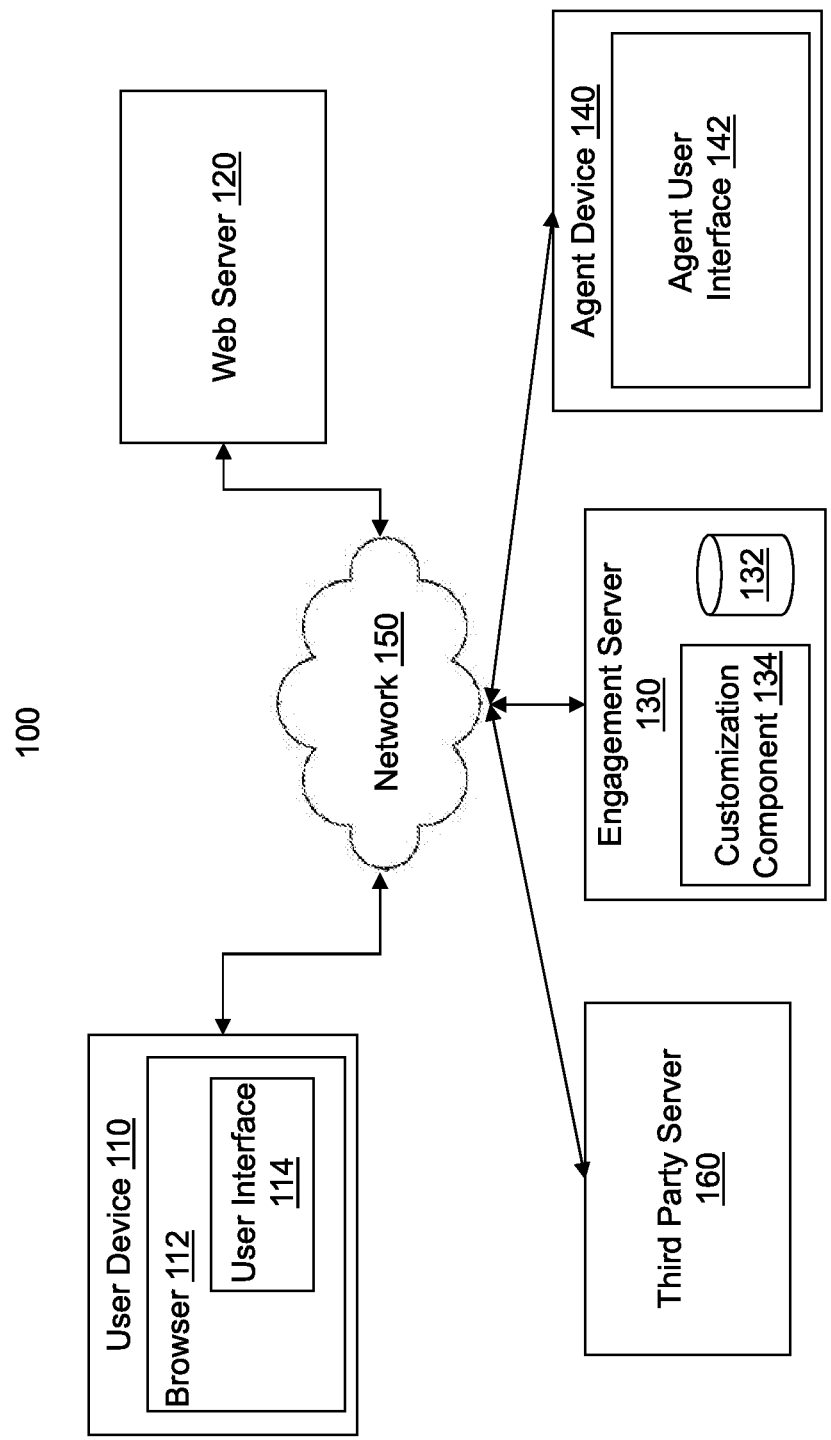
FIG. 1 is an exemplary diagram illustrating a computerized system for dynamic user interface customization.

FIG. 1 is a diagram illustrating an example computerized system 100 for facilitating dynamic user interface customization through implementation of any combination of the techniques described herein. The system 100 includes a user device 110, a web server 120, an engagement server 130, and an agent device 140. As depicted, each of these components is connected for communication via network 150. The user device 110 includes a browser 112 and user interface 114. Engagement server 130 includes database 132 and customization component 134. The agent computer 140 includes agent user interface 142. The system 100 includes third party server 160.

In accordance with this disclosure a user device such as the device depicted at 110 may be a personal computer, (e.g., a PC or a laptop) including a processor and memory. Alternatively, the user device 110 may be a smart phone, a personal digital assistant, a tablet PC, and/or any another computing device capable of displaying browser 112 and/or the user interface 114 to the user associated with the user device 110. The user device 110 may be a computing device capable of displaying web content using a web browser (e.g., the browser 112). The browser 112 may be implemented through software used by the user device 110 to display web content received from the web server 120 (e.g., web pages). For example, the web browser may be Microsoft Internet Explorer.

Although FIG. 1 depicts browser 112, this specific inclusion is for exemplary purposes only. In certain embodiments of this disclosure, the user device 110 may display user interface 114 without the interface being associated with a web browser. Additionally, while FIG. 1 only includes a single user device 110, the system can include multiple user devices. When such an arrangement is used, two or more users may participate in a joint engagement (i.e. more than two parties involved) with agent computer 140 (or multiple agent computers, not shown). For example, two users can participate in an engagement that is moderated by an agent.

The user interface 114 may be, for example, a chat window facilitating chat between the user of the user device 110 and a third party (e.g., the agent operating agent device 140). For example, if the user encounters difficulties navigating a web page displayed by the browser 112, the user can initiate a chat help session (e.g., by clicking a "click to chat" button) with an agent who is operating agent device 140. In this way, the agent may be able to help the user properly navigate the web page. The user, via the user interface 114, can chat with the agent to learn how to navigate the web page.

In other example embodiments included within the scope of this disclosure, the user interface 114 may be, or may include, a video chat interface, online help interface, or any other type of user interface. In certain implementations of the techniques presented herein, the user interface 114 may be configured so as to not be displayed on the user device 110 until after an initializing action (or other predetermined criteria) is taken by the user of the user device 110. Additionally or alternatively, the user interface 114 may be configured such that the interface 114 enables the user to minimize, maximize and/or control predetermined aspects of the user interface 114.

In accordance with this disclosure, the web server 120 may be, for example, a single web server with a processor and memory. In other embodiments, the web server 120 may comprise a plurality of web servers configured to provide web services (e.g., to serve web site content). The web server 120 may provide content which may be accessed at the user device 110 through utilization of browser 112.

The engagement server 130 can be, for example, a single server with a processor and memory. In some embodiments, the engagement server 130 may include multiple servers connected directly to each other, or connected through the network 15. The engagement server 130 can be configured to provide any number of technical solutions or capabilities. One such possible capability may be provided to an agent who, through operating agent device 140, provides customer service or assistance to a user operating user device 110. The solution provided by the engagement server 130 to the agent may involve providing the agent with capabilities associated with the agent's operation of agent device 140. With these capabilities, the agent may be able to provide improved or enhanced customer service, help, recommendations to users (e.g., visitors to a website, such as user devices 110 loading web content provided by web server 120 via browser 112) or improved management of communicative connections with users. For example, the engagement server 130 can establish an online chat help session between the user device 110 and the agent device 140. The engagement server 130 may be configured to provide such a capability in response to a user clicking a "click to chat" button at user device 110, in response to a web page being displayed in the browser 112, or upon satisfaction of some other predetermined criteria established by code associated with browser 112, etc.).

Additionally or alternatively, the engagement server 130 may be configured to provide a number of services to remote users (e.g., users interacting or interfacing with a device such as user device 110). The customization component 134 may be configured to dynamically customize the user interface 114. The customization component 134 may be configured to use data from past user or agent engagements (e.g., historical data indicative of functions which were activated, used or displayed, or were otherwise associated with a user interface, and whether the engagement(s) associated with these functions were successful). The customization component 134 may be configured with capabilities for intelligently learning from the data how to optimize a particular user experience, based on previous successful engagements. The customization component 134 can process such data and use the data to customize user interfaces. This processing and customizing may involve using rules (e.g., stored in database 132), predictive analytics, multivariate analysis and testing, and/or other methods or analytics.

For example, in one aspect of the present disclosure, the engagement server 130 may receive data indicative of user actions occurring on the user device 110 (e.g., taken by a user of the user device 110). The customization component 134 may then use the received data to intelligently add and/or remove functions from the user interface 114. As another example, the engagement server 130 can receive data from the agent user interface 142. This data may include instructions to add and/or remove functions from the user interface 114, and may be used by the customization component 134 to execute appropriate action in response to the instructions.

The engagement server 130 can transmit data to the agent device 140 (e.g., to the agent user interface 142) that provides feedback about the user interface 114 and/or about a user's current or past experience with the interface 114. For example, engagement server 130 may provide functions or capabilities to an agent, so that the agent may push new functions and/or content to the user interface 114. The agent may be enabled to push these functions and/or content via agent user interface 142, in conjunction with network 150. However, the agent may need to know a current configuration of the user interface 114 before selecting a new function to be pushed to the user interface 114. In this case, the engagement server 130 may be configured to transmit data which describes a user's experience with user interface 114.

The data may be transmitted to the agent device 140, thereby enabling the agent to understand the user's experience on the user interface 114, and/or the current configuration and/or functionality of the user interface 114. For example, the engagement server 130 can transmit a snapshot of the user interface 114 at a particular time. The snapshot may be transmitted to agent device 140, thereby enabling the agent to ascertain the user interface 114 configuration. The agent can use the data to determine what the user is experiencing through the user interface 114, and can use that determination to customize the user interface 114 by adding new functions to it.

In accordance with certain embodiments of this disclosure, the engagement server 130 may be configured to cause an agent user interface 142 to be displayed at agent device 140. This interface on agent device 140 may enable the agent to receive data pertinent to helping a user and/or customizing a user interface experience for the user associated with user interface 114. For example, once the engagement server 130 causes an agent user interface 142 to be displayed on the agent device 140, the engagement server 130 may then receive data associated with the agent's interactions or experience with agent user interface 142. Additionally or alternatively, the engagement server may receive data associated with a user's interactions or experience with user interface 114. The engagement server may be configured to use this data to appropriately customize agent user interface 142 or user interface 114.

As described herein, a user or agent experience with an interface may be understood to include, be characterized by, or be affected by, one or more functions operating in conjunction with the interface, an interaction model between a first function and a second function (e.g., which describes how the two functions interact with one another), user or agent behavior (e.g., a combination of user or agent interaction with one or more components or functions associated or operating in conjunction with the interface), a restriction affecting a user and/or agent interacting with the interface, an automated interaction model (e.g., which may executed by the engagement server 130 to determine when to dynamically alter the user interface 114 or agent user interface 142, based on previously collected data), a set of permissions for the user of the user device 110, or any other arrangement(s) recognizable, in light of this disclosure, to an artisan of ordinary skill in any one of the arts to which this disclosure pertains.

This paragraph will discuss one possible example implementation of certain of the techniques and methods disclosed herein. This example implementation is presented only for the purposes of demonstrating one way in which data related to a user experience may be used, in accordance with this disclosure, to customize an interface. In this example implementation, user behavior data may be used by engagement server 130 for purposes of customizing an agent user interface (such as the one shown at 142) or a user interface (such as the one shown at 114). In this case, engagement server 130 may be configured to install certain functions which operate on user device 110 or agent device 140, and in conjunction with user interface 110 or agent user interface 142, as the case may be. These particular functions, when installed or activated, may provide functionality based on, or in response to, user or agent interaction data associated with the user interface 114 or agent user interface 142. This interaction data may be received and processed by engagement server 130, and additionally, in some embodiments, may then be provided to agent device 140 by the engagement server 130.

Implementations such as those which are consistent with the aforementioned implementation description may enable an agent to intelligently affect a user's experience or customize the user interface 114 based on the user's or agent's current behavior. For example, the engagement server 130 may be configured to provide an agent with information relevant to serving the user, whereby the provided information is selected by the engagement server 130 based on detection of a specific term provided by the user or agent in chat or in another type of communication session. A function operating on agent device 140 or user device 110 may be used to detect such a term. The function may inform engagement server 130 that the term has been used. The engagement server 130 may then apply a business rule to analyzes the term and determine the term if it is associated with a relevant product. Alternatively, the function may apply the rule to analyze the term. In either case, the function or the engagement server 130 could cause an additional function to be incorporated into the user interface 110 or agent user interface 142. The additional function could be configured to provide product information to the user or agent related to any product determined to be relevant, in view of the detected term and the business rule.

The engagement server 130 may be configured to include a database 132. In an embodiment of this disclosure, the engagement server 130 may be configured to use the database 132 to store feedback information indicative of the state of user interface 114. For example, the engagement server 130 can keep a log of all functions added to and/or removed from the user interface 114 (e.g., added automatically via the engagement server 130, and/or added via an agent through the agent user interface 142), and can be configured to use the log to determine a current state of the user interface 114.

In some examples, the user interface 114 can include a function that transmits feedback information to the engagement server 130. For example, a function can be configured to periodically send data to the engagement sever 130 indicative of a snapshot of the user interface 114 (e.g., at predetermined time intervals or upon request from the engagement server 130). Based on this snapshot, the Agent may be provided with a detailed visual depiction of the visitor's experience, as well as a visual depiction of what the visitor sees at user interface 114. In this way, the system may suggest next steps to the agent based on the current view or experience of the visitor.

The database 132 stores, for example, the functions that can be added to and/or removed from the user interface 114. For example, a function can be an agent function that provides information about an agent (e.g., the person using the agent user interface 142 on the agent device 140, which may be in some sort of communication with the user device 110 via online chat, video chat, voice chat, etc.) that the user of the user device 110 is in communication with through the user interface 114. As another example, the function can be a shopping cart function that lists a set of products the user of the user device 110 has selected while browsing a website, using the browser 112, that is provided by the web server 120 (e.g., an online catalog). As another example, the function can include a data transfer function that downloads data to the user (e.g., a coupon), allows a third party to push data to the user (e.g., allows the agent device 140 to upload a file, document, presentation, work file, etc. to the user device 110), and/or the like. As another example, the function can be a video function that allows a user to control playback of video content (e.g., to play, pause, stop a video being streamed to the user). As another example, the function can be an audio function that allows a user to control playback of audio content (e.g., to play, pause, stop audio being streamed to the user). As another example, the function can be a social engagement function (e.g., Twitter, Facebook, etc.) that allows a user to push the engagement between it and the agent device 140 (e.g., an online chat) into the user's social engagement application to continue the experience in the user's social engagement application. As another example, the function can provide a service that affects the user's experience (e.g. a translation service). As another example, the function can be a secure information transfer function (e.g., which is compliant with the PCI Security Council standards for the exchange of credit card numbers) that allows transfer of Personal Identifiable Information (PII) over the communication channel (e.g., over chat).

In some examples, a function can be configured to detect events, and to take one or more actions based on the detected events. For example, a detected event may be triggered by a user's actions taken on the user device 110, the browser 112, the user interface 114, etc. Such events can also be events which occur in response to one or more other functions associated with the user interface 114, etc. The functions can be configured to send data to the engagement server 130 (and/or the agent user interface 142). For example, the functions can be configured to transmit data indicative of state changes and user interface interaction. For example, the video function can transmit data to the engagement server 130 indicative of the user's actions taken with respect to the video function (e.g., transmit information indicative of the user pressing play on the user interface 114, information indicative of the user pressing pause on the user interface 114, etc.).

This disclosure shall not be interpreted to be limited in scope by the mention or description of example functions presented herein. Rather, the functions specifically presented and described are included for example purposes only. This disclosure is intended to cover any and all functions which may expand, limit, alter, track, monitor, improve, document or otherwise affect a user experience associated with a user interface such as user interface 114. This disclosure is also intended to cover the many other types of related or applicable functions which would, in view of this disclosure, be readily recognizable to a person skilled in one or more of the arts to which this disclosure applies.

In some examples, the functions are added to the user interface 114 without changing the visual display of the user interface 114. Such functions may be thought of as behind-the-scenes functions with respect to the user interface 114. For example, a function can be added that tracks events and initiates responsive actions based on the detected events. For example, a function can detect a reception of data sent to the user device 110 from the agent device 140 (e.g. messages from the agent operating the agent user interface 142) and initiate actions based on the received data (e.g., transmitting a message in response to the received data). As another example, a function can be added to detect a user's interaction with other functions of the user interface 114. This may enable the detecting function to initiate actions which are determined to be appropriate based on the user's interactions with the user interface 114.

The agent device 140 can be, for example, a personal computer (e.g., a PC or a laptop) which includes a processor and memory. Alternatively, and in accordance with this disclosure, the agent device 140 may a smart phone, a personal digital assistant, a tablet PC, and/or any another computing device capable of providing the agent user interface 142 and/or operations or processing associated with it.

The agent user interface 142 may be configured so that the agent interfacing with the agent device 140 is able to control, activate, remove and/or invoke functions provided by the engagement server 130. For example, the agent interface 142 may be configured to that the agent has the option of activating a chat help session involving the user device 110). An example agent console is described in U.S. patent application Ser. No. 13/413,197, which was filed on Mar. 6, 2012, entitled "Occasionally-Connected Computing Interface," and which is incorporated by reference herein in its entirety. The agent user interface 142 can also display a detailed visual "playback" of historical user experience data (e.g., historical charts and/or graphs of function usage, success rates for functions, etc.). The historical user experience data can include, for example, historical data collected from previously-deployed user interfaces, such as which functions were used for the user interface and whether the engagement was successful (e.g., whether an agent was able to solve the user's problem via the user interface). The historical data playback can be used, for example, for backtracking and analysis capabilities, as well as the use of Natural Language Processing (NLP) (e.g., which can analyze text in a text chat) to identify correlations and insights of functions (or user interface configurations) by looking at the functions and/or the engagement experience. While the terms "agent" and "agent device" are used herein, the terms should be interpreted broadly to include any end user, such as a typical agent as well as a user similar to that using the user device 120. As another example, an agent can be a business ambassador for a company (e.g., a representative or spokesperson for the company).

Network 150 can be, for example, a packet-switching network that can forward packets to other devices based on information included in the packet.

Third party server 160 can provide services for functions added to the user interface 114 (e.g., in addition to those services provided by the engagement server 130). The engagement server 130 can be configured to incorporate technologies from the third party sever 160 (and/or other third party servers, not shown), which can add to the robustness of the experience presented to the user through the user interface 114. The engagement server 130 can incorporate disparate technologies and/or applications into the user interface 114 (e.g., much like an operating system).

The system 100 is an example of a computerized system that is configured to perform the methods described herein. However, the system structure and content recited with regards to FIG. 1 is presented for exemplary purposes only and is not intended to limit this disclosure to implementations involving the specific structure shown in FIG. 1. As will be apparent to one of ordinary skill in the art, many recognizable system structures can be used to implement the techniques and methods described herein, without departing from the scope of this disclosure. For example, a web server 120, while included for illustrative purposes, may be omitted without departing from the spirit of the invention. As another example, a plurality of user devices and/or agent devices (not shown) may be used in the system 100.

In addition, information may flow between the elements, components and subsystems described herein using any technique. Such techniques include, for example, passing the information over the network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 2B:
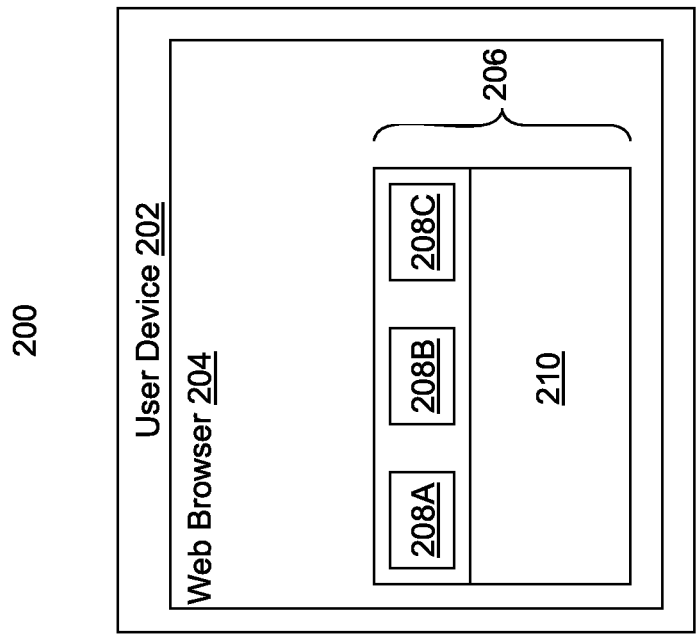
FIG. 2B illustrates an exemplary diagram of a user interface being dynamically customized.
Figure 2A:
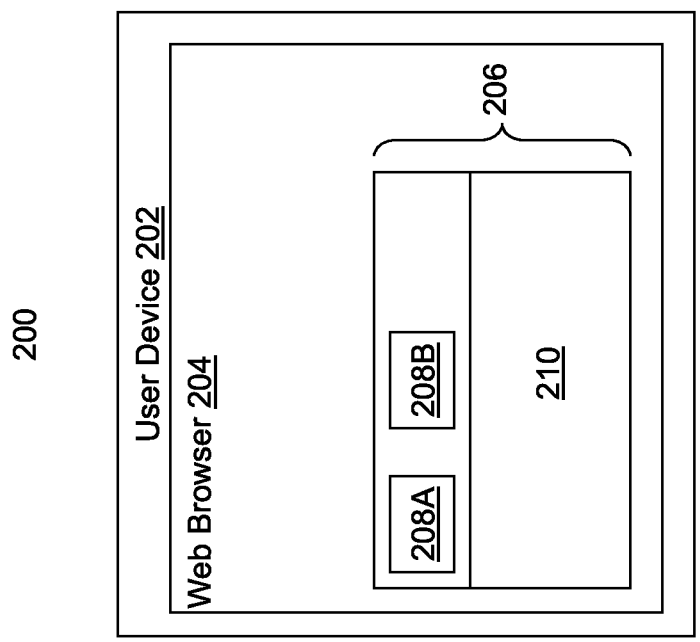
FIG. 2A illustrates an exemplary diagram of a user interface being dynamically customized.

FIGS. 2A-2B depict an example of user device components involved in dynamic customization of a user interface, in accordance with certain of the methods disclosed herein. FIG. 2A depicts a user device 202, a web browser 204, and a user interface 206. Furthermore, as depicted in FIG. 2A, user interface 206 includes functions 208A, 208B. The user interface 206 also includes a chat console 210.

FIG. 2B depicts each of the aforementioned components shown in FIG. 2A, and also includes function 208C, which will be explained in greater detail in following paragraphs. FIGS. 2A and 2B are used for illustrative purposes only. In accordance with this disclosure, a user interface may include any number of additional and or alternative functions and components. For example, a user interface such as user interface 206 may include other interactive components or features in addition to, or instead of, chat console 210. Also, a user interface need not include any active functions (e.g., the user interface may include simply a list of functions which are selectable by the user). The user interface 206 may be an interface associated with a computer to computer connection, a video display (e.g., with notification that the video is being watched), and/or any other type(s) of engagement or communication interface (e.g., an interface linking the agent device 140 and the user device 110). For example, certain user interfaces which are within the scope of this disclosure are described in U.S. patent application Ser. No. 13/371,163, entitled "Analytic Driven Engagement," filed on Feb. 10, 2012, which addresses analytic driven engagement, and is incorporated herein in its entirety. In some examples, the initial user interface 206 is not displayed on the web browser 204 until the user device 110 or engagement server 130 determines the user interface 206 should be displayed (e.g., the engagement server 130 may make such a determination based on interaction data, as is described further below).

Figure 3:
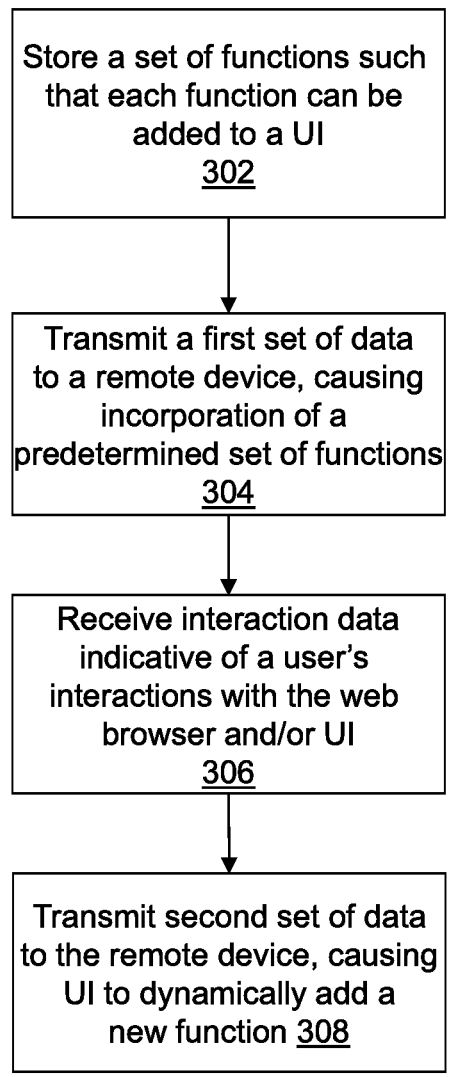
FIG. 3 illustrates an exemplary computerized method for dynamic user interface customization.

FIG. 3 illustrates an example computerized method 300 for dynamic user interface customization in accordance with the present disclosure. The discussion of the method depicted in FIG. 3 will refer back to previous FIGS. 1, 2A and 2B, as these previous figures depict components and elements which may be involved in certain of the method steps described in FIG. 3.

As depicted in FIG. 3, at step 302, the engagement server 130 stores a set of functions which may be installed or activated on a user interface (e.g., for user interface 114). In certain embodiments, the user interface may, but need not necessarily, be displayed in a browser such as the one depicted at 112. At step 304, the engagement server 130 transmits a first set of data to user device 110. This transmitted data causes the user interface 114 to be displayed on the user device 110 such that the interface displays a predetermined set of the functions stored at engagement server 130. The data causes these displayed functions (e.g., functions 208A and 208B, as shown in FIG. 2A) to be incorporated into the user device 110. At step 306, the engagement server 130 receives interaction data from the user device 110. As depicted, the interaction data is indicative of a user's interactions with the browser 112 and/or user interface 114. At step 308, the engagement server 130 transmits a second set of data to the user device 110. The second set of data is selected by the engagement server 130 based on the interaction data, and causes the user interface 114 to dynamically add a new function from the stored set to the user interface 114.

Referring to step 302, each function stored at the engagement server 130 may be a function which can be added to the user interface 114. For example, the stored functions may be functions such as the functions described above with respect to FIG. 1. These functions include video playback, audio playback, file transfer, and/or any other function which could be configured to be incorporated into the user interface 114.

Referring to step 304, the first set of data (e.g., data which determines which functions will be initially included in the user interface 206) can be predetermined and stored in a configuration file. The engagement sever 130 can store such a configuration file in a database such as database 132, for example. The configuration file can be configured for a particular customer of the engagement serer 130. For example, the customer may be a website provider (e.g., web server 120, which provides content that can be loaded by a browser such as the browser depicted at 112). The website provider can configure its website, such that, when the website is requested by the browser 112, a code module is loaded in the browser 112. The code module, when loaded, may then control the time at which the user interface 114 is displayed to the user of the user device 110. For example, a code module of this type may prevent the user interface 114 from being displayed until after the user clicks a "click to chat" button, or until after the user has remained at a particular web page in browser 112 for a predetermined period of time (e.g., ten seconds), and/or the like.

Referring further to step 304, the first set of data need not cause actual display of functions on the user interface 114. For example, the engagement server 130 can transmit data to the user device 110 which causes the user interface 114 to dynamically incorporate or activate a function such that the new function is not displayed in the user interface (e.g., the function adds functionality to the user interface 114 without requiring a displayed component). For example, such a function can include javascript code executable by the user's browser 112 for monitoring and storing information related to user interactions with websites loaded using the browser 112. As another example, the function can include javascript code that (e.g., when executed by the browser 112) for detecting one or more events associated with the user interface 114 (e.g., button presses, menu-item selections, checkbox selections, and/or other graphical user interface interactions).

Referring further to step 304, certain of the function(s) in the set of functions stored at engagement server 130 may be displayed for selection within the user interface 114. In this way, a user operating user device 110 may select the function for use, activation or installation when it is displayed. Displaying a function for selection may include, for example, displaying a clickable icon, menu item, checkbox, and/or any other graphical user interface component which can be used or invoked by a user.

Referring to step 306, the engagement server 130 can receive interaction data indicative of the user's interactions with the browser 112 and/or the user interface 114. For example, the browser 112 can include a code module (not shown) which executes in the browser 112 to track and store the user's navigation or search history associated with the user's use of browser 112. The code module can cause this stored interaction data to be transmitted to the engagement server (e.g., on command, periodically, etc.). As another example, the user interface 114 can include a code module which monitors a user's interactions with the user interface 114 (via the user device 110).

Referring further to step 306, the engagement server 130 can use the interaction history data to determine when to add and/or remove functions from the user interface 114 (while method 300 addresses adding functions, functions can also be removed from the user interface 114). For example, the engagement server 130 can reference a stored set of rules which describe when to add a function to the user interface 114. The engagement server can use the rules by processing the interaction data in light of the rules. In this way, the engagement server 130 can use the rules (and/or other similar forms of artificial intelligence) to determine which functions are added and/or removed from the user interface 114 (to provide the user with the best possible experience). In some examples, the engagement server 130 uses data indicative of a change of the user interface 114 (e.g., data that is transmitted between the user interface 114 and the engagement server 130 that provides constant updates about what is occurring with the user interface 114 on the user device 110), data indicative of user interface behavior (e.g., interaction among functions), or both, to determine when to add and/or remove functions from the user interface 114.

As another example, the engagement server 130 can transmit the interaction data to the agent device 140. An operator of the agent device 140 can use the agent user interface 142 to view the interaction data to determine when to add/remove functions from the user interface 114 (e.g., if the user clicked on a video link displayed using a video function, if the user started playback of the video using the video function, if the user paused playback of the video using the video function, etc.). The operator can transmit a signal to the engagement server 130 to cause the engagement server 130 to transmit a new function to the user device 110 for incorporation into the user interface 114.

Referring to step 308, the user device 110 dynamically adds the new function to the user interface 114. As described above, the new function may include a visual aspect (e.g., a checkbox, menu item, button, icon, etc.). In some examples, the new function is displayed as a selectable item in the user interface 114 that the user can select to use a function associated with the new function (e.g., new function 208C of FIG. 2B, which was newly added to the interface 206 from FIG. 2A, which only includes functions 208A and 208B). For example, once a function is added to the user interface 114, the user can invoke the functionality of the new function by clicking an icon associated with the function.

As an example of method 300, referring to FIGS. 2A and 2B, assume an agent is conducting an online chat with a user of the user device 202 (e.g., a situation in which an online chat involves the agent user interface 142 of agent device 140, and the user interface 206 includes the chat console 210) to help the user navigate a website loaded in the browser 112. In this case, the agent user interface 142 may display the chat information entered by the user via the chat console 210. The agent on the agent device 140 can determine, for example, that it is most beneficial to play a movie for the user. In accordance with the techniques disclosed herein, the agent, by using the agent user interface 142, may be able to send a command to the engagement server 130. The command may cause a new function, such as function 208C, to be loaded in the user interface 206. In this way, the user may be provided with the ability to control playback of the desired video content. For example, function 208C can include playback controls (e.g., pause, fast forward, rewind, etc.) that the user of the user device 110 can use to control playback of the video content. The function 208C can include a listening component (and/or the engagement server 130 can send a second function to the user device 110) that monitors which of the playback controls are used, and transmits information indicative of the same to the agent user interface 142. For example, when the user invokes, using the user interface 114, the play button, the function transmits data to the agent device 140 indicative of the user starting playback of the video content.

As another example, referring to FIGS. 2A-2B, the engagement server 130 establishes a chat communication between the user of the user device 202 (via the chat console 210) and an agent (e.g., via agent user interface 142 of FIG. 1). The user begins asking the agent about the website loaded in the web browser 204 (e.g., the user is having trouble navigating the website). It becomes apparent through the chat conversation that the agent can better assist the user by viewing the same webpage, however the user interface 206 does not include desktop sharing. Therefore, the agent causes the engagement server 130 to add a desktop sharing function to the user interface 206 (e.g., function 208C). The user can invoke the desktop sharing function by selecting the function (or, in some examples, the user need not take any action to invoke the function). The desktop sharing function can share the user's screen with the agent, so that the agent can guide the user through navigating the web page on the user's web browser 204.

The agent can add (and/or remove) any number of functions to the user interface 206 (e.g., video playback, file transfers, etc.). For example, if the agent is still having trouble helping out the user, the agent can add a video function so the conversation can escalate to a video chat. The experience is in the user interface, and the user interface can change form to best suit addressing the user's problem. For example, while systems often use separate channels for online chat, voice, and video communications, the user interface 206 can provide a unified communication channel that allows the agent to seamlessly switch among different communication modalities with the user. The communication modalities can also include traditional communication channels (e.g., phone communications over the PSTN). For example, the agent can switch from chat to voice communication, and then switch again from voice to video communication, all while using the same user interface 206. The agent can add and/or remove the additional communication modalities by, for example, adding and/or removing functions from the user interface 206. For example, if an agent determines that he needs to move from a chat communication to a voice communication, the agent can add a voice communication function (e.g., via the agent user interface 142) to the user interface 206 such that the user interface 206 can provide both the chat communication and the voice communication to the user of the user device 110 (e.g., the user can click the newly-added voice communication function to engage in voice communication with the agent without opening any additional interfaces or taking any further actions on the user device 110).

Figure 4:
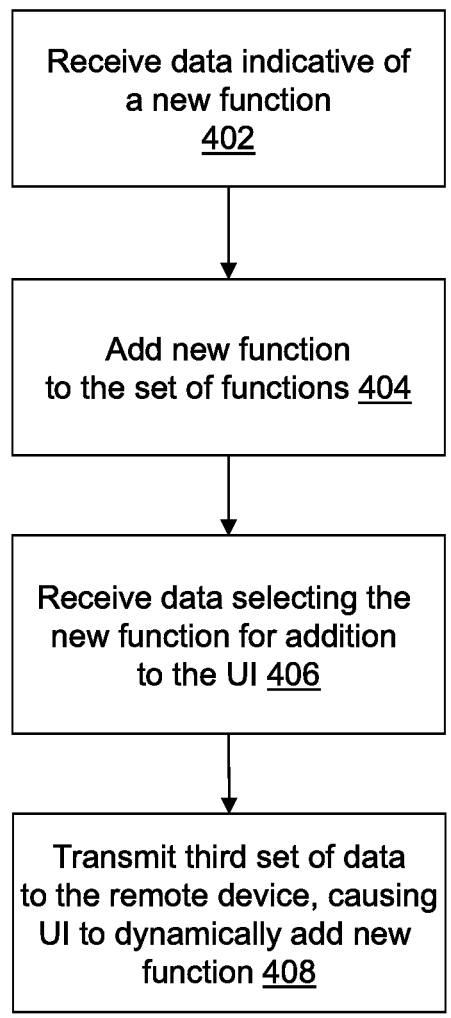
FIG. 4 illustrates an exemplary computerized method for adding new functions for dynamic user interface customization.

FIG. 4 illustrates an exemplary computerized method 400 for adding new functions for dynamic user interface customization. At step 402, the engagement server 130 receives data indicative of a new function. At step 404, the engagement server 130 adds the new function to the set of functions (e.g., adds the function to the database 132 for storage) so that the new function can be incorporated into a user interface. At step 406, the engagement server 130 receives data selecting the new function for addition to a user interface. At step 408, the engagement server 130 transmits data to the remote device (e.g., to the user device 110) that causes the user interface (e.g., user interface 114) to dynamically add the selected function to the user interface, such that a function associated with the selected function is incorporated into the user interface, wherein prior to addition of the selected function to the user interface, the user interface did not include the function associated with the selected function.

Referring to step 402, functions can be added to the engagement server to add functions for a third party, such that the third party can use the functions to customize the user interface based on the third party's needs. For example, if the third party is a new user of the engagement server 130 dynamic customization services, the third party can create new/additional functions designed specifically for the needs of the third party. For example, if the third party would like to use a video function but there are no video functions (e.g., there are no video functions stored in the database 132, and/or the video function(s) stored in the database 132 do not include desired functionality), the third party can create a new video function to include all the functions desired by the third party (e.g., via the agent user interface 142 of FIG. 1).

The dynamic customization systems and methods described herein provide for flexibility of designing functions and customizing user interfaces to dynamically add and/or remove functions (e.g., during use of the user interface, without any action required on the GUI user's part). Any function can be configured to communicate with any other function(s) running in the user interface framework, and therefore the functions can be used to design any kind of desired behavior. The communication and signaling between the functions and/or the environment (e.g., the web browser, user interface, etc.) can be managed in a pluggable way. For example, a predefined language set can be implemented to support the communication and signaling. A user of the service can implement functions by designing their own callback procedures and callback names to signal between, for example, two functions, that the user adds to the engagement server 130.

The dynamic customization systems and methods can measure the success of an engagement. For example, it may be desirable to measure how successful certain engagements are with users (e.g., where a successful engagement is measured by whether a user's problem was solved, whether the user was satisfied with the engagement, etc.). As an example, the system may determine that engagements that start with chat communication and then escalate to voice communication are more successful at solving the user's problems than those engagements that only use chat communication. As another example, it may be desirable to measure how often a function is used in a successful user engagement. For example, an agent may be more likely to add a particular function to the user interface 206 if it has a higher rate of success than other functions.

The user interface experience can be used on any device. For example, if a user is interacting with the user interface on their home computer, they can continue the experience from their mobile phone. For example, the agent can send the user a code on the home computer, and the user can scan the code using their mobile device by taking a picture of the code and using a code converting application (the agent can send the code using a code function). After scanning the code, the code converting application can re-create the user interface 114 on the user's mobile device (and/or the interaction, such as chat, the user was engaged in with the agent). The user can then continue the interactions on their mobile phone.

The engagement server 130 can provide a modular, personalized service to individual users. For example, the engagement server 130 can associate a user with a brand. The brand can allow users to have an "assistant" (e.g., virtual assistant that goes everywhere with the user). If the user asks the virtual assistant a question, it can initiate an online chat window with agents working for the brand (e.g., which can expand into a movie, etc. based on the user's interactions with the agents).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computer-implemented method comprising:
   storing, at a server, multiple functions for a graphical interface, wherein the multiple functions are executable on a user device, and wherein the graphical interface facilitates communication between the user device and an agent device;
   transmitting an initial set of data, wherein the initial set of data is associated with an initial function of the multiple functions, wherein when received at the user device, the initial set of data causes the user device to display the graphical interface customized with the initial function, and wherein the initial function facilitates a communication session between the user device and the agent device;
   transmitting a feedback set of data, wherein the feedback set of data is associated with the initial function, wherein when received at the agent device, the feedback set of data causes the agent device to display a current configuration of the graphical interface for the user device, and where the feedback set of data facilitates pushing a dynamic update to the current configuration of the graphical interface at the user device;
   receiving agent interaction data, wherein the agent interaction data describes an additional function of the multiple functions and instructions to push the additional function via the dynamic update;
   selecting an additional set of data associated with the additional function; and
   transmitting the additional set of data, wherein when received at the user device, the additional set of data causes the additional function to be included in the graphical interface, such that the additional function is available for use with the graphical interface for the communication session at the user device.

2. The computer-implemented method of claim 1, wherein the feedback set of data causes the agent device to display a snapshot of the graphical interface at the user device at a particular time.

3. The computer-implemented method of claim 1, wherein the feedback set of data causes the agent device to generate the graphical interface matching the current configuration for the user device.

4. The computer-implemented method of claim 1, wherein the feedback set of data includes details of a problem experienced by a user of the user device.

5. The computer-implemented method of claim 1, wherein the additional set of data causes the additional function to be dynamically added to the graphical interface at the user device as the current configuration of the graphical interface is displayed at the agent device.

6. The computer-implemented method of claim 1, further comprising:
   receiving response data, wherein when the response data is received from the user device following transmission of the additional set of data, the response data describes an updated current configuration of the graphical interface with the additional function at the user device; and
   transmitting an updated set of feedback data, wherein when received at the agent device, the updated set of feedback data causes the agent device to display the updated current configuration of the graphical interface including the additional function for the user device.

7. The computer-implemented method of claim 1, further comprising:
   receiving updated problem data from the user device based on the additional set of data; and
   transmitting an updated set of feedback data, received at the agent device, the updated set of feedback data causes the agent device to display an updated current configuration of the graphical interface including the additional function for the user device with updated details of a problem experienced by a user of the user device.

8. A system, comprising:
   a memory; and
   one or more processors coupled to the memory, the one or more processors configured to perform operations including:
   storing, at a server, multiple functions for a graphical interface, wherein the multiple functions are executable on a user device, and wherein the graphical interface facilitates communication between the user device and an agent device;
   transmitting an initial set of data, wherein the initial set of data is associated with an initial function of the multiple functions, wherein when received at the user device, the initial set of data causes the user device to display the graphical interface customized with the initial function, and wherein the initial function facilitates a communication session between the user device and the agent device;
   transmitting a feedback set of data, wherein the feedback set of data is associated with the initial function, wherein when received at the agent device, the feedback set of data causes the agent device to display a current configuration of the graphical interface for the user device, and where the feedback set of data facilitates pushing a dynamic update to the current configuration of the graphical interface at the user device;
   receiving agent interaction data, wherein the agent interaction data describes an additional function of the multiple functions and instructions to push the additional function via the dynamic update;
   selecting an additional set of data associated with the additional function; and
   transmitting the additional set of data, wherein when received at the user device, the additional set of data causes the additional function to be included in the graphical interface, such that the additional function is available for use with the graphical interface for the communication session at the user device.

9. The system of claim 8, wherein the feedback set of data causes the agent device to display a snapshot of the graphical interface at the user device at a particular time.

10. The system of claim 8, wherein the feedback set of data causes the agent device to generate the graphical interface matching the current configuration for the user device.

11. The system of claim 8, wherein the feedback set of data includes details of a problem experienced by a user of the user device.

12. The system of claim 8, wherein the additional set of data causes the additional function to be dynamically added to the graphical interface at the user device as the current configuration of the graphical interface is displayed at the agent device.

13. The system of claim 8, further comprising:
receiving response data, wherein when the response data is received from the user device following transmission of the additional set of data, the response data describes an updated current configuration of the graphical interface with the additional function at the user device; and
transmitting an updated set of feedback data, wherein when received at the agent device, the updated set of feedback data causes the agent device to display the updated current configuration of the graphical interface including the additional function for the user device.

14. A non-transitory computer readable medium comprising instructions that, when executed by one or more processors of a device, cause the device to perform operations comprising:
storing, at a server, multiple functions for a graphical interface, wherein the multiple functions are executable on a user device, and wherein the graphical interface facilitates communication between the user device and an agent device;
transmitting an initial set of data, wherein the initial set of data is associated with an initial function of the multiple functions, wherein when received at the user device, the initial set of data causes the user device to display the graphical interface customized with the initial function, and wherein the initial function facilitates a communication session between the user device and the agent device;
transmitting a feedback set of data, wherein the feedback set of data is associated with the initial function, wherein when received at the agent device, the feedback set of data causes the agent device to display a current configuration of the graphical interface for the user device, and where the feedback set of data facilitates pushing a dynamic update to the current configuration of the graphical interface at the user device;
receiving agent interaction data, wherein the agent interaction data describes an additional function of the multiple functions and instructions to push the additional function via the dynamic update;
selecting an additional set of data associated with the additional function; and
transmitting the additional set of data, wherein when received at the user device, the additional set of data causes the additional function to be included in the graphical interface, such that the additional function is available for use with the graphical interface for the communication session at the user device.

15. The non-transitory computer readable medium of claim 14, wherein the feedback set of data causes the agent device to display a snapshot of the graphical interface at the user device at a particular time.

16. The non-transitory computer readable medium of claim 14, wherein the feedback set of data causes the agent device to generate the graphical interface matching the current configuration for the user device.

17. The non-transitory computer readable medium of claim 14, wherein the feedback set of data includes details of a problem experienced by a user of the user device.

18. The non-transitory computer readable medium of claim 14, wherein the additional set of data causes the additional function to be dynamically added to the graphical interface at the user device as the current configuration of the graphical interface is displayed at the agent device.

19. The non-transitory computer readable medium of claim 14, further comprising:
receiving response data, wherein when the response data is received from the user device following transmission of the additional set of data, the response data describes an updated current configuration of the graphical interface with the additional function at the user device; and
transmitting an updated set of feedback data, wherein when received at the agent device, the updated set of feedback data causes the agent device to display the updated current configuration of the graphical interface including the additional function for the user device.

20. The non-transitory computer readable medium of claim 14, further comprising:
receiving updated problem data from the user device based on the additional set of data; and
transmitting an updated set of feedback data, received at the agent device, the updated set of feedback data causes the agent device to display an updated current configuration of the graphical interface including the additional function for the user device with updated details of a problem experienced by a user of the user device.

* * * * *